US008365288B2

(12) United States Patent
Yoo

(10) Patent No.: US 8,365,288 B2
(45) Date of Patent: Jan. 29, 2013

(54) ANTI-MALWARE DEVICE, SERVER, AND METHOD OF MATCHING MALWARE PATTERNS

(75) Inventor: InSeon Yoo, Yongin-Si (KR)

(73) Assignee: Samsung SDS Co., Ltd., Seoul (KR)

( * ) Notice: Subject to any disclaimer, the term of this patent is extended or adjusted under 35 U.S.C. 154(b) by 0 days.

(21) Appl. No.: 13/165,429

(22) Filed: Jun. 21, 2011

(65) Prior Publication Data

US 2011/0314548 A1  Dec. 22, 2011

(30) Foreign Application Priority Data

Jun. 21, 2010  (KR) .................. 10-2010-0058504
Jun. 17, 2011  (KR) .................. 10-2011-0059075

(51) Int. Cl.
*H04L 29/06* (2006.01)

(52) U.S. Cl. ........................................................ 726/24

(58) Field of Classification Search ............. 726/22–25; 713/188
See application file for complete search history.

(56) References Cited

U.S. PATENT DOCUMENTS

| 5,701,464 | A | * | 12/1997 | Aucsmith | 1/1 |
| 5,920,900 | A | * | 7/1999 | Poole et al. | 711/216 |
| 7,328,349 | B2 | | 2/2008 | Milliken | |
| 7,539,871 | B1 | | 5/2009 | Osborn | |
| 7,624,436 | B2 | | 11/2009 | Balakrishnan et al. | |
| 7,650,639 | B2 | | 1/2010 | Kramer et al. | |
| 7,757,290 | B2 | | 7/2010 | Costea et al. | |
| 2007/0240218 | A1 | | 10/2007 | Tuvell et al. | |
| 2007/0240219 | A1 | | 10/2007 | Tuvell et al. | |
| 2007/0240220 | A1 | | 10/2007 | Tuvell et al. | |
| 2007/0240221 | A1 | | 10/2007 | Tuvell et al. | |
| 2007/0240222 | A1 | | 10/2007 | Tuvell et al. | |
| 2009/0044273 | A1 | * | 2/2009 | Zhou et al. | 726/24 |
| 2009/0293126 | A1 | | 11/2009 | Archer et al. | |
| 2009/0320133 | A1 | | 12/2009 | Viljoen et al. | |
| 2010/0077482 | A1 | | 3/2010 | Adams | |
| 2010/0228701 | A1 | * | 9/2010 | Harris et al. | 707/683 |
| 2010/0274755 | A1 | | 10/2010 | Stewart | |
| 2011/0060876 | A1 | * | 3/2011 | Liu | 711/108 |
| 2011/0078799 | A1 | | 3/2011 | Sahita et al. | |

OTHER PUBLICATIONS

Freescale and Kaspersky. "Accelerated Antivirus Solution Platform for OEM Vendors" White Papers. 2007 [retrieved on Aug. 6, 2011] Retrieved from the Internet<URL:http://www.freescale.com/files/32bit/doc/white_paper/KASPERSKYWP.pdf>, 16 pages.
S. Venkatesan et al. "Advanced mobile agent security models for code integrity and malicious availability check." Journal of Network and Computer Applications. vol. 33, Issue 6. Nov. 2010, pp. 661-671 [retrieved on Aug. 6, 2011] Retrieved from the Internet<URL:http://www.sciencedirect.com/science/article/pii/S1084804510000457>.
Kim et al. "An Efficient Multi-hash Pattern Matching Scheme for Intrusion Detection in FPGA-based Reconfiguring Hardware." Proceedings of the 8th WSEAS International Conference on Applied Computer Science (ACS 2008), pp. 199-204. [retrieved on Aug. 6, 2011] Retrieved from the Internet<URL:http://www.wseas.us/e-library/conferences/2008/venice/acs/acs32.pdf>.
Communication dated Dec. 29, 2011 issued by the European Patent Office in counterpart European Patent Application No. 11170732.9.

* cited by examiner

Primary Examiner — Jeffrey D Popham
(74) Attorney, Agent, or Firm — Sughrue Mion, PLLC

(57) ABSTRACT

An efficient virus detection, malware detection, and packet filtering system in a mobile device by providing optimized hash functions from a server to a mobile device that reduce hash collisions during the virus detection, malware detection, and packet filtering in a system-on-chip configuration.

12 Claims, 20 Drawing Sheets

FIG. 5

| VIRUS PATTERN DATA ||
|---|---|
| ADDRESS | PATTERN |
| 0x1000 | abcdefg |
| 0x2000 | hiiklmnopq |
| ... | ... |
| 0x6000 | abcxyz |
| ... | ... |

ANTI-MALWARE DEVICE, SERVER, AND METHOD OF MATCHING MALWARE PATTERNS

CROSS-REFERENCE TO RELATED APPLICATIONS

This application claims priority from Korean Patent Application Nos. 10-2010-0058504 and 10-2011-0059075, respectively filed on Jun. 21, 2010 and Jun. 17, 2011, in the Korean Intellectual Property Office, the disclosures of which are incorporated herein by reference in their entireties.

BACKGROUND

1. Field

Methods and apparatuses consistent with exemplary embodiments relate to an anti-malware device, a server, and a method of matching malware patterns, and more particularly, to an anti-malware device, a server, and a method of matching malware patterns capable of minimizing hash collisions in virus pattern matching.

2. Description of the Related Art

Malware is software designed to harm a computer system, such as computer viruses, Trojan horses, malicious codes, and the like. Attention is needed for malware since undesired software is installed and a system can be hijacked only by clicking a link or an image of a famous search page, unlike a conventional concept that an attached file is opened or software is downloaded and installed.

Less emphasis is placed on an operating system and a file system than on a computer, and importance of used data is relatively low, and thus mobile viruses on a wireless communication system are not greatly recognized up to now.

However, as hardware of a mobile terminal becomes high-ranking, and application programs executed therein become various and complex, it is highly possible malware that has attacked a computer may also cause a serious damage to the mobile terminal. In particular, as a wireless mobile Internet service such as WiBro tends to spread, mobile malware that attacks vulnerabilities of a service and a portable terminal application program such as Bluetooth, a multimedia messaging system (MMS), etc. appears, in addition to malware that attacks a vulnerability of a computer application program. These various mobile malware may cause serious damages of inducing a malfunction of a portable terminal, deleting data, or leaking out user private information.

SUMMARY

One or more exemplary embodiments may overcome the above disadvantages and other disadvantages not described above. However, it is understood that one or more exemplary embodiments are not required to overcome the disadvantages described above, and may not overcome any of the problems described above.

One or more exemplary embodiments provide an anti-malware device, a server, and a method of matching malware patterns that select a hash coefficient or a hash function to prevent a hash collision in the server and transmit the hash coefficient or the hash function to the anti-malware device, thereby minimizing hash collisions.

One or more exemplary embodiments also provide an anti-malware device, a server, and a method of matching malware patterns that calculate a hash coefficient in a server of an anti-malware system, thereby preventing a hash collision in a client.

According to an aspect of an exemplary embodiment, there is provided an anti-malware device comprising: a communication unit which receives from a server, at least one hash coefficient and data; a hash value generating unit which generates hash values for malware patterns and a hash value for target data by using a hash function having the at least one hash coefficient; a hash matcher unit which matches the hash value of the target data to the hash values of the malware patterns; and a matching unit which matches the malware patterns and the target data if the hash matcher unit succeeds in the matching.

According to an aspect of another exemplary embodiment, there is provided a server for transmitting malware patterns to an anti-malware device that performs malware pattern matching by using a hash function having a hash coefficient, the server comprising: an updating unit which transmits the hash coefficient to the anti-malware device when the malware patterns is transmitted to the anti-malware device.

According to an aspect of still another exemplary embodiment, there is provided a method of performing a malware pattern matching operation by using a hash coefficient, the method comprising: selecting a hash coefficient based on the malware patterns so that a probability of collisions between hash values of the malware patterns is minimized; calculating the hash values for the malware patterns by using the selected hash coefficient; and when at least one of the hash values for the malware patterns and a hash value for target data match each other, matching the malware patterns and the target data.

According to an aspect of still another exemplary embodiment, there is provided a malware pattern matching method by using a hash function, the method comprising: calculating hash values of malware patterns by using the hash function; calculating hash values of target data by using the hash function; when the hash values for the malware patterns and the hash values for the target data match each other, matching the malware patterns and the target data; and determining whether the calculated hash values of the malware pattern data collide each other.

Additional aspects and advantages of the exemplary embodiments will be set forth in the detailed description, will be obvious from the detailed description, or may be learned by practicing the exemplary embodiments.

BRIEF DESCRIPTION OF THE DRAWINGS

The above and/or other aspects will be more apparent by describing in detail exemplary embodiments, with reference to the accompanying drawings, in which:

FIG. 5 is a table of a pattern database (DB);

The patent or application file contains at least one drawing executed in color. Copies of this patent or patent application publication with color drawing(s) will be provided by the Office upon request or payment of the necessary fee.

DETAILED DESCRIPTION OF THE EXEMPLARY EMBODIMENTS

Exemplary embodiments will now be described more fully with reference to the accompanying drawings to clarify aspects, features and advantages of the invention. The exemplary embodiments may, however, be embodied in many different forms and should not be construed as limited to the exemplary embodiments set forth herein. Rather, the exemplary embodiments are provided so that this disclosure will be thorough and complete, and will fully convey the scope of the application to those of ordinary skill in the art. It will be understood that when an element, layer or region is referred to as being "on" another element, layer or region, the element, layer or region can be directly on another element, layer or region or intervening elements, layers or regions.

The terms used herein are for the purpose of describing particular exemplary embodiments only and are not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, layers, regions, elements, components, and/or groups thereof, but do not preclude the presence or addition of one or more other features, integers, steps, operations, layers, regions, elements, components, and/or groups thereof. As used herein, the term "and/or" includes any and all combinations of one or more of the associated listed items.

Figure 1:
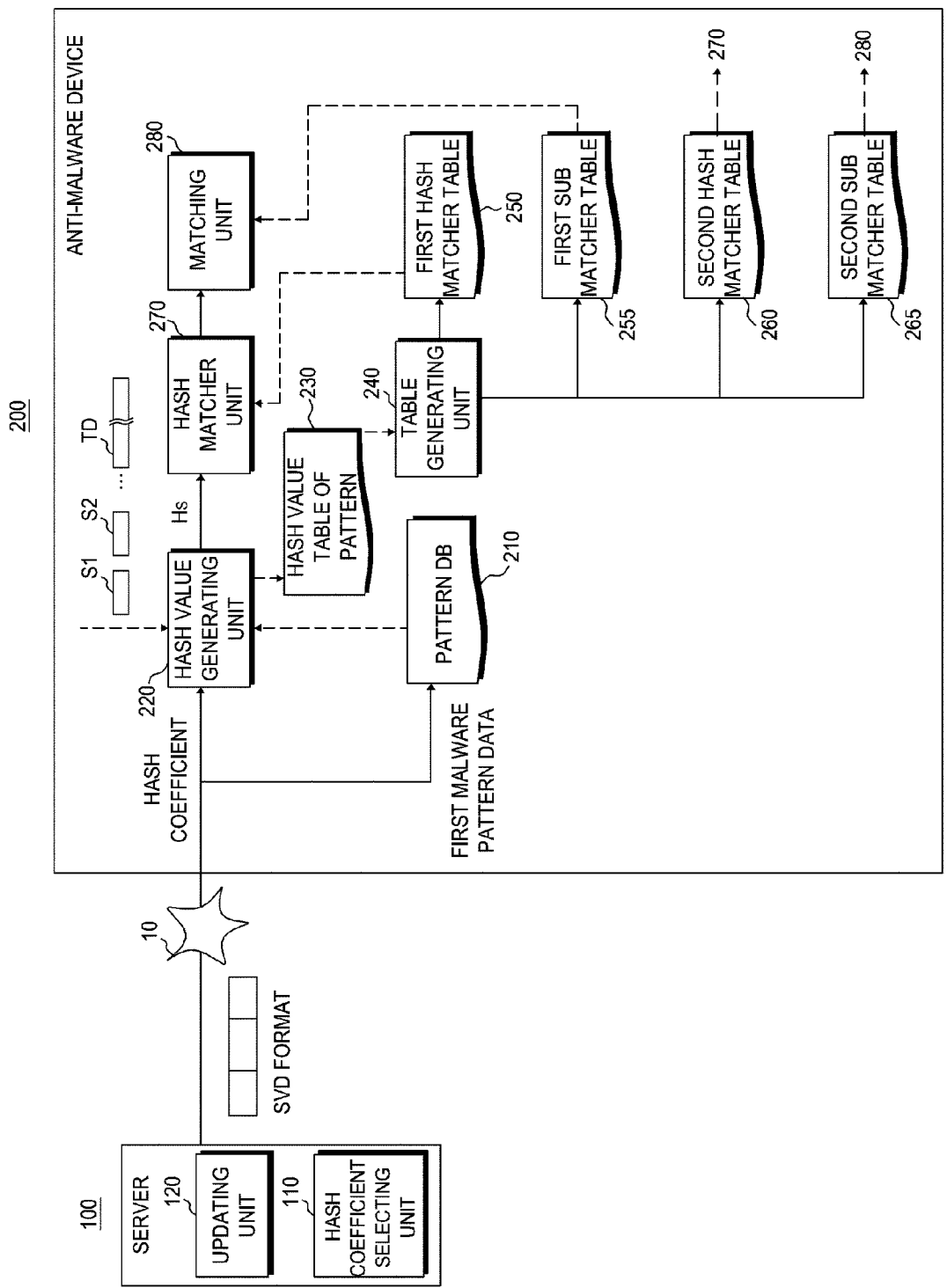
FIG. 1 is a block diagram of an anti-malware system according to an exemplary embodiment.

FIG. 1 is a block diagram of an anti-malware system according to an exemplary embodiment. In other exemplary embodiments, the system may be used to search for items such as books, files, etc., in a database. Further, the system may be used in other exemplary embodiments to search for items, e.g., an individual's files, in a cloud server or a cloud service.

Referring to FIG. 1, the anti-malware system includes a server 100 and an anti-malware device 200. The server 100 and the anti-malware device 200 may be connected to each other over a network 10 to perform communication.

The server 100 transmits a malware pattern database (DB) and at least one hash coefficient to the anti-malware device 200. The malware pattern DB is consisting of a plurality of malware patterns. The malware patterns may describe viruses, Trojan horses, infectious files, malicious codes, and the like.

The malware patterns are reference data used by the anti-malware device 200 to detect whether target data is infected with malware. The malware patterns may include virus pattern for virus scanning and rule pattern for firewall filtering. The virus pattern and the rule pattern will be described later.

The hash coefficient is used to calculate a hash value in the anti-malware device 200. The hash coefficient may be selected as a coefficient to prevent a hash collision as much as possible. According to an exemplary embodiment, the hash coefficient may include a virus hash coefficient selected based on the virus patterns of the malware patterns and a rule hash coefficient selected based on the rule patterns.

If update malware pattern is generated, the server 100 reselects the hash coefficient, and transmits an update malware pattern DB including the update malware patterns and the reselected hash coefficient to the anti-malware device 200.

The anti-malware device 200 performs malware pattern matching by using a hash function having at least one hash coefficient. The at least one hash coefficient is selected by the server 100. To this end, the anti-malware device 200 uses the hash coefficient included in the malware pattern DB received from the server 100 as a coefficient of the hash function and substitutes the malware patterns for a parameter of the hash function. The anti-malware device 200 may correspond to a mobile electronic device such as a system on-chip, a notebook, a desk top computer, a smart phone, a smart card, a Semiconductor IP (Intellectual Property), etc. Hereinafter, the "malware pattern or malware patterns" are often referred to as "malware pattern data", the "malware pattern data to be transmitted to the anti-malware device 200" or the "malware pattern data previously stored in the anti-malware device 200" is referred to as "first malware pattern data", the "hash coefficient to be transmitted to the anti-malware device 200" is referred to as a "first hash coefficient", and a "hash function having the first hash coefficient" is referred to as a "first hash function".

Also, hereinafter, if the first malware pattern data transmitted from the server 100 to the anti-malware device 200 is virus pattern data, the first hash coefficient transmitted with the virus pattern data may be a virus hash coefficient. If the first malware pattern data transmitted from the server 100 to the anti-malware device 200 is rule pattern data, the first hash coefficient transmitted with the rule pattern data may be a rule hash coefficient. If the first malware pattern data transmitted from the server 100 to the anti-malware device 200 includes both of the virus pattern data and the rule pattern data, the first hash coefficient transmitted with the virus pattern data and the rule pattern data may include the virus hash coefficient and the rule hash coefficient. According to an exemplary embodiment, the server 100 may include a hash coefficient selecting unit 110 and an updating unit 120.

When hash functions are applied to the first malware pattern data, the hash coefficient selecting unit 110 selects the first hash coefficient to be transmitted to the anti-malware device 200 based on the hash function that generates a minimum hash collision result.

For example, the hash coefficient selecting unit 110 may select the first hash coefficient by using an algorithm that minimizes a probability of collisions of hash values obtained when the first malware pattern data is applied to the hash function. More specifically, the hash coefficient selecting unit 110 may obtain hash values of the first malware pattern data by using a plurality of candidate hash groups $G_N$ (N=1, 2 . . . ). Each candidate hash group $G_N$ includes at least one candidate hash coefficient. For example, the first candidate hash group $G_1$ includes candidate hash coefficients $a_1$, $b_1$, $c_1$, and the second candidate hash group $G_2$ includes candidate hash coefficients $a_2$, $b_2$, $c_2$. The hash coefficient selecting unit 110 may calculate hash values for each candidate hash group $G_N$ by applying the candidate hash coefficients of the candidate hash groups $G_1$, $G_2$, . . . to the hash function. In this regard, the hash coefficient selecting unit 110 may calculate the hash values based on the first malware pattern data being used by the anti-malware device 200. The hash coefficient selecting unit 110 may count the number of collisions (i.e. the number of hash collisions) of the hash values for each candidate hash group $G_N$, and select a hash coefficient of the candidate hash group having the least hash collision as the first hash coefficient.

Alternatively, the hash coefficient selecting unit 110 may select a hash coefficient that minimizes variance values of the hash values obtained as the first hash coefficient when the first malware pattern data is applied to the hash function. That is, the hash coefficient selecting unit 110 calculates variance values of the hash values for each candidate hash group $G_N$ if the hash values for each candidate hash group $G_N$ are calculated. The hash coefficient selecting unit 110 may acknowledge the candidate hash group that leads to calculation of the least variance value among the variance values calculated for each candidate hash group GN and select a hash coefficient of the acknowledged candidate hash group as the first hash coefficient. For expository purposes, the term "variance value" as used herein defined as a measure of how far a set of numbers are spread out from each other. For example, the variance value is the expected value of the squared difference between a variable's realization and the variable's mean.

The updating unit 120 may transmit the selected first hash coefficient as the malware pattern data when transmitting the first malware pattern data to the anti-malware device 200. The first hash coefficient transmitted by the updating unit 120 may be used to calculate hash values of the first malware pattern data transmitted to the anti-malware device 200.

Figure 2:
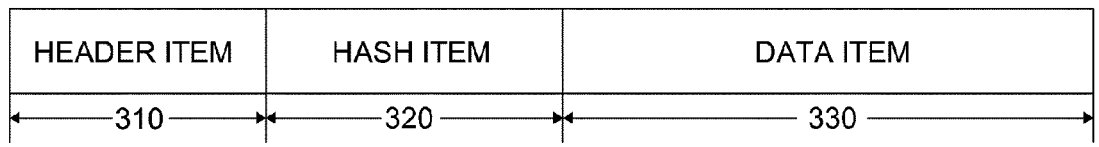
FIG. 2 is a diagram for explaining a format of a packet and/or a file of malware pattern data transmitted to an anti-malware device according to an exemplary embodiment.

FIG. 2 is a diagram for explaining a format of a packet and/or a file of malware pattern data transmitted to the anti-malware device 200 according to an exemplary embodiment of the present invention.

Referring to FIG. 2, the packet and/or the file includes a header item 310, a hash item 320, and a data item 330. The updating unit 120 writes header information in the header item 310, writes a first hash coefficient in the hash item 320, and records first malware pattern data in the data item 330. The updating unit 120 may transmit the packet and/or the file to the anti-malware device 200 in an SVD format if data is written in the header item 310, the hash item 320, and the data item 330.

Meanwhile, the first malware pattern data is described below when there is data to be updated. Hereinafter, "data to be updated among the first malware pattern data" is referred to as "update malware pattern data", a hash coefficient recalculated further based on the update malware pattern data is referred to as a "second hash coefficient", and a "hash function having the second hash coefficient" is referred to as a "second hash function".

The hash coefficient selecting unit 110 may select the second hash coefficient by using an algorithm that minimizes a probability of collisions between hash values obtained when the update malware pattern data and the first malware pattern data are applied to a hash function. Alternatively, the hash coefficient selecting unit 110 may select a hash coefficient that minimizes variance values of the hash values obtained as the second hash coefficient when the update malware pattern data and the first malware pattern data are applied to the hash function.

The updating unit 120 may transmit the selected second hash coefficient and the update malware pattern data to the anti-malware device 200. Referring to FIG. 2, the updating unit 120 may write header information in the header item 310, the second hash coefficient in the hash item 320, and the update malware pattern data in the data item 330, and transmit the packet and/or the file to the anti-malware device 200.

Referring back to FIG. 1, the anti-malware device 200 according to an exemplary embodiment may include a pattern DB 210, a hash value generating unit 220, a hash value table of the pattern 230, a table generating unit 240, a first hash matcher table 250, a first sub matcher table 255, a second hash matcher table 260, a second sub matcher table 265, a hash matcher unit 270, and a matching unit 280.

The anti-malware device 200 receives the malware pattern DB including the first malware pattern data and the first hash coefficient from the server 100 in the SVD format shown in FIG. 2. In other exemplary embodiments, other formats may be used instead of the SVD format. The first malware pattern data among the malware pattern DB is stored in a memory (not shown) in the pattern DB 210, and the first hash coefficient is input into the hash value generating unit 220.

The pattern DB 210 stores the first malware pattern data received from the server 100. The first malware pattern data may be used to detect whether target data is infected with malware when the matching unit 280 performs matching on the target data.

When the first malware pattern data received from the server 100 includes both of the virus pattern data and the rule pattern data, the pattern DB 210 may include a virus pattern DB and a rule pattern DB. The virus pattern DB and the rule pattern DB may be stored in a memory (not shown) included in a system-on-chip (SoC).

The virus pattern DB is a set of the virus pattern data and is used to perform virus scanning on the target data. That is, the virus pattern data is used to detect whether the target data is infected with a virus.

The rule pattern DB is a DB storing the rule pattern data. The rule pattern data is used to filter packet data input from the outside, i.e. to determine whether to block or allow the packet data. The rule pattern data may be directly set by a user or set as default by the server 100 and be transmitted to a user device.

The hash value generating unit 220 may generate hash values Hp for the first malware pattern data by using at least one of first hash coefficient received from the server 100 and the first malware pattern data stored in the pattern DB 210. That is, the hash value generating unit 220 may generate hash values $H_V$ for the virus pattern data or generate hash values $H_R$ for the rule pattern data. Therefore, the hash values $H_P$ may be the hash values $H_V$ or the hash values $H_R$ below.

The first hash coefficient is selected by the server 100 based on a minimum hash collision result through the hash function for the first malware pattern data. A first hash function is a function determined to minimize a probability of collisions between hash values that are randomly obtained with respect to the first malware pattern data to be transmitted to the anti-malware device 200.

The hash value generating unit 220 may generate hash values for the first malware pattern data by using the first hash function having the first hash coefficient.

An operation of generating hash values for the virus pattern data by using the virus pattern data and the virus hash coefficient and performing virus scanning in the anti-malware device 200 will now be described with reference to FIGS. 3 through 5.

Figure 3:
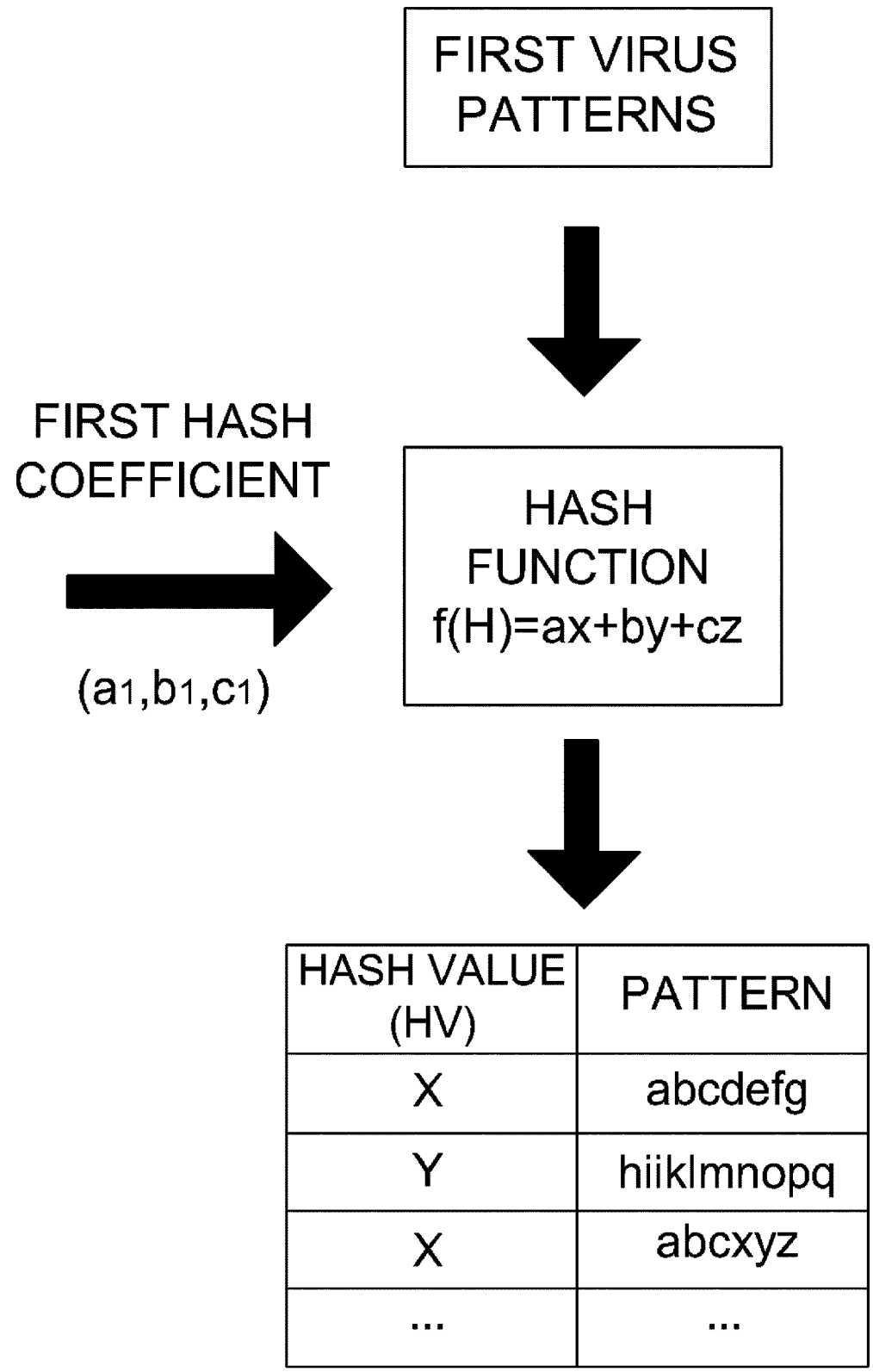
FIG. 3 schematically illustrates a series of operations of generating hash values for virus pattern data among first malware pattern data in a hash value generating unit.

FIG. 3 schematically illustrates a series of operations of generating hash values for the virus pattern data among the first malware pattern data in the hash value generating unit 220.

Referring to FIG. 3, when a hash function format is f(H)=ax+by+c, a, b, c denote hash coefficients, and x, y, z denote parameters. Thus, when the first hash coefficients received from the server 100, i.e. the virus hash coefficients, are $a_1$, $b_1$, $c_1$, the hash value generating unit 220 may generate a first hash function f(H)=$a_1$x+$b_1$y+$c_1$z by substituting $a_1$, $b_1$, $c_1$ for a, b, c, respectively. The hash value generating unit 220 may input values of the virus pattern data stored in the pattern DB 210 into x, y, z, and generate the hash values $H_V$ for each of the virus pattern data. Values input as the parameters may have all numbers input from the virus pattern data. That is, if the number of input parameter values is 100, the maximum number of hash values for one piece of the virus pattern data may be 100.

If the hash values $H_V$ for the entire virus pattern data are generated, the hash value generating unit 220 may generate the hash value table of the pattern 230.

The hash value table of the pattern 230 is a mapping table of the hash values $H_V$ generated by the hash value generating unit 220 and patterns of the virus pattern data corresponding to the hash values $H_V$, and may be loaded on a memory (not shown). In FIG. 3, when any one of the hash values among the virus pattern data is "X", a pattern of the virus pattern data corresponding to the hash value X has abcdefg.

The table generating unit 240 may generate the first hash matcher table 250 and the first sub matcher table 255 based on the hash value table of the pattern 230.

Figure 4:
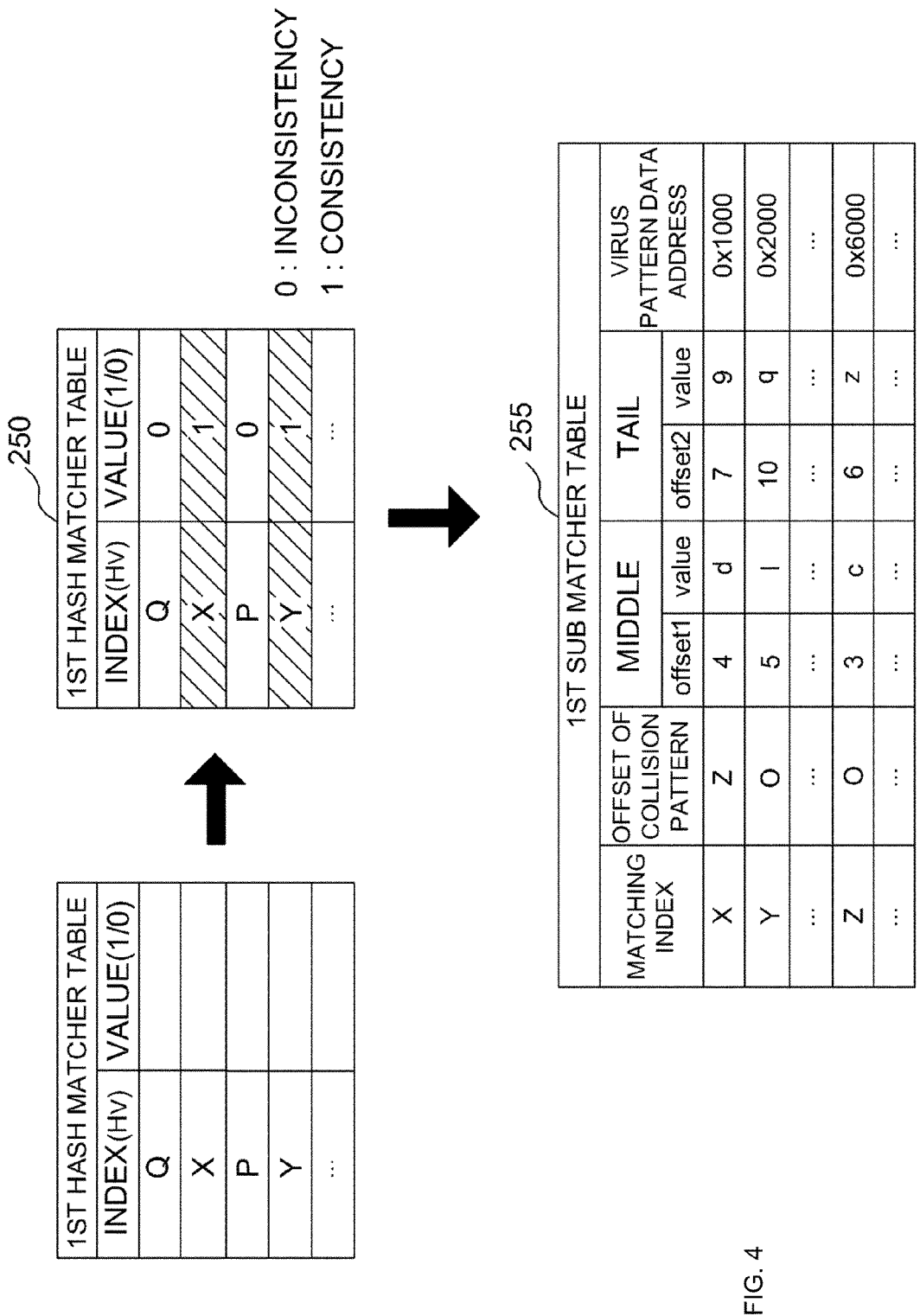
FIG. 4 is a first hash matcher table and a first sub matcher table.

FIG. 4 is the first hash matcher table 250 and the first sub matcher table 255.

Referring to a right table of FIG. 4, all the hash values $H_V$ that can be generated from the first hash function is defined as an index.

The table generating unit 240 may generate the first hash matcher table 250. For example, the table generating unit 240 may compare the hash values $H_V$ of the hash value table of the pattern 230 with all indices, if the hash values $H_V$ are same as indices, and set the same indices as "1". Value "0" is used when there is no same index as the hash values $H_V$, and value "1" is used when there is the same index as the hash values $H_V$. The hash value table of the pattern of FIG. 3 includes X and Y as the hash values $H_V$, and thus "1" is indicated in indices X and Y of the first hash matcher table 250 of FIG. 4.

The table generating unit 240 may generate the first sub matcher table 255 by using the hash value table of the pattern 230 and the first hash matcher table 250. The first sub matcher table 255 may be used to perform at least one of light pattern matching (LPM) and exact pattern matching (EPM) for virus scanning in the matching unit 280. The LPM and the EPM will be described later.

Referring to FIG. 5, the table generating unit 240 may generate the first sub matcher table 255 with respect to the indices (including X and Y) that are identical to the hash values $H_V$ among all the indices of the first hash matcher table 250. Hereinafter, the "indices identical to the hash values $H_V$ among all the indices" are referred to as "matching indices".

The table generating unit 240 may generate the first sub matcher table 255 by using a middle value and a tail value of each virus pattern data corresponding to the matching indices, and addresses in which the virus pattern data is stored. The middle value and the tail value of each virus pattern data corresponding to the matching indices may refer to the hash value table of the pattern 230. For example, if the matching index is X, a pattern of X is abcdefg. The table generating unit 240 may acknowledge a middle value d and a tail value g of the pattern abcdefg in the hash value table of the pattern 230.

A "virus pattern data address" of FIG. 4 is an address in which the virus pattern data is stored. "Offset1" denotes an offset between a head value and a middle value of a pattern. "Offset2" denotes an offset between a head value and a tail value of a pattern.

If two or more of the hash values $H_V$ are the same as indices in the first hash matcher table 250, a hash collision is regarded as having occurred. If, for example, two of the hash values $H_V$ are the same as indices in the first hash matcher table 250, an "offset of a collision pattern" means a matching index allocated to one of the two hash values $H_V$. Since the virus pattern data corresponding to the two hash values $H_V$ differ, the two hash values $H_V$ may have different middle values and tail values. Thus, the table generating unit 240 generates the first sub matcher table 255 by allocating a different matching index to one of the two hash values $H_V$. Referring to FIG. 5, a collision pattern offset of the matching index X is Z. This means that the same hash value $H_V$ is mapped to a matching index Z.

Referring back to FIG. 1, the hash value generating unit 220 may receive the target data on which virus scanning is to be performed and further generate hash values for the target data. The target data may include a plurality of pieces of sub data S1, S2, S3, . . . that are divided into previously defined sizes. In this case, the hash value generating unit 220 may sequentially receive the sub data S1, S2, S3, . . . and generate hash values $H_s$ for each of the sub data S1, S2, S3, . . . . The hash value generating unit 220 may provide the matching unit 280 with the generated has values $H_S$ for the sub data S1, S2, S3, . . . . Hereinafter, the first sub data S1 and the hash value $H_{S1}$ for the first sub data S1 will now be described.

The hash matcher unit 270 may receive the hash value $H_{S1}$ for the first sub data S1 from the hash value generating unit 220. The hash matcher unit 270 may match the hash value $H_{S1}$ for the first sub data S1 to matching indices (for example, X and Y) of the first hash matcher table 250 in which 1 is indicated. The matching indices in which 1 is indicated are a part of the hash values $H_V$ of the virus pattern data.

Hardware (not shown) that interfaces with the hash matcher unit 270 may determine a success of matching. The hardware may determine that matching is successful if the matching indices (for example, X and Y) of the first hash matcher table 250 in which 1 is indicated include a matching index identical to the hash value $H_{S1}$ for the first sub data S1. For example, when the hash value $H_{S1}$ for the first sub data S1 is X, if the matching indices include X, the hardware determines that matching is successful.

If matching is successful by the hash matcher unit 270, the matching unit 280 may match at least one piece of the virus pattern data and a pattern of the first sub data S1. More specifically, the matching unit 280 may perform an operation of matching the virus pattern data corresponding to the matching index (for example, X) identical to the hash value $H_{S1}$ and the pattern of the first sub data S1. This is because the "matching index identical to the hash value $H_{S1}$ of the first sub data S1" is a hash value generated by substituting the virus pattern data for a first hash function. A result of matching the virus pattern data and the pattern of the first sub data S1 influences on determining whether the first sub data S1 is infected with malware.

To this end, the matching unit 280 may use the LPM and the EPM.

The LPM is a method of matching patterns by using the virus pattern data and a middle value and a tail value of the first sub data S1. More specifically, the matching unit 280 acknowledges a middle value and a tail value of a matching index (for example, X) identical to the hash value $H_{S1}$ of the first sub data S1 in the first sub matcher table 255. The matching unit 280 acknowledges the middle value and the tail value of the first sub data S1. The matching unit 280 matches the acknowledged middle value of the matching index and the middle value of the first sub data S1, and matches the acknowledged tail value of the matching index and the tail value of the first sub data S1. Though, in the above-explained LPM, the middle values and the tail values are matched respectively, it is also possible in an alternative embodiment to match the front values and the middle values respectively, or to match the front values and the tail values respectively.

As a result of using the LPM, if the middle values are not identical to each other or the tail values are not identical to each other, it means that the first sub data S1 has no pattern of the virus pattern data. Thus, the first sub data S1 may be determined to be normal data that is not infected with malware.

Meanwhile, as the result of using the LPM, if the middle values are identical to each other and the tail values are identical to each other, the matching unit 280 may perform a pattern matching operation by using the EPM. More specifically, as the result of using the LPM, if the middle values and the tail values are identical to each other, the matching unit 280 may match patterns by using values of all positions of the virus pattern data and the first sub data S1.

To this end, the matching unit 280 acknowledges an address of the virus pattern data that is mapped to and stored in the matching index X based on the first sub matcher table 255. The matching unit 280 reads a pattern of the virus pattern data stored in the acknowledged address from a memory (not shown). The pattern DB 210 or the hash value table of the pattern 230 may be loaded in the memory. FIG. 5 is a table of the pattern DB 210. The matching unit 280 matches the entire pattern abcdefg of the virus pattern data stored in the corresponding address and an entire pattern of the first sub data S1.

Hereinafter, an operation of generating hash values of rule pattern data by using the rule pattern data and a rule hash function and filtering the hash values in the anti-malware device 200 will now be described with reference to FIG. 6.

Figure 6:
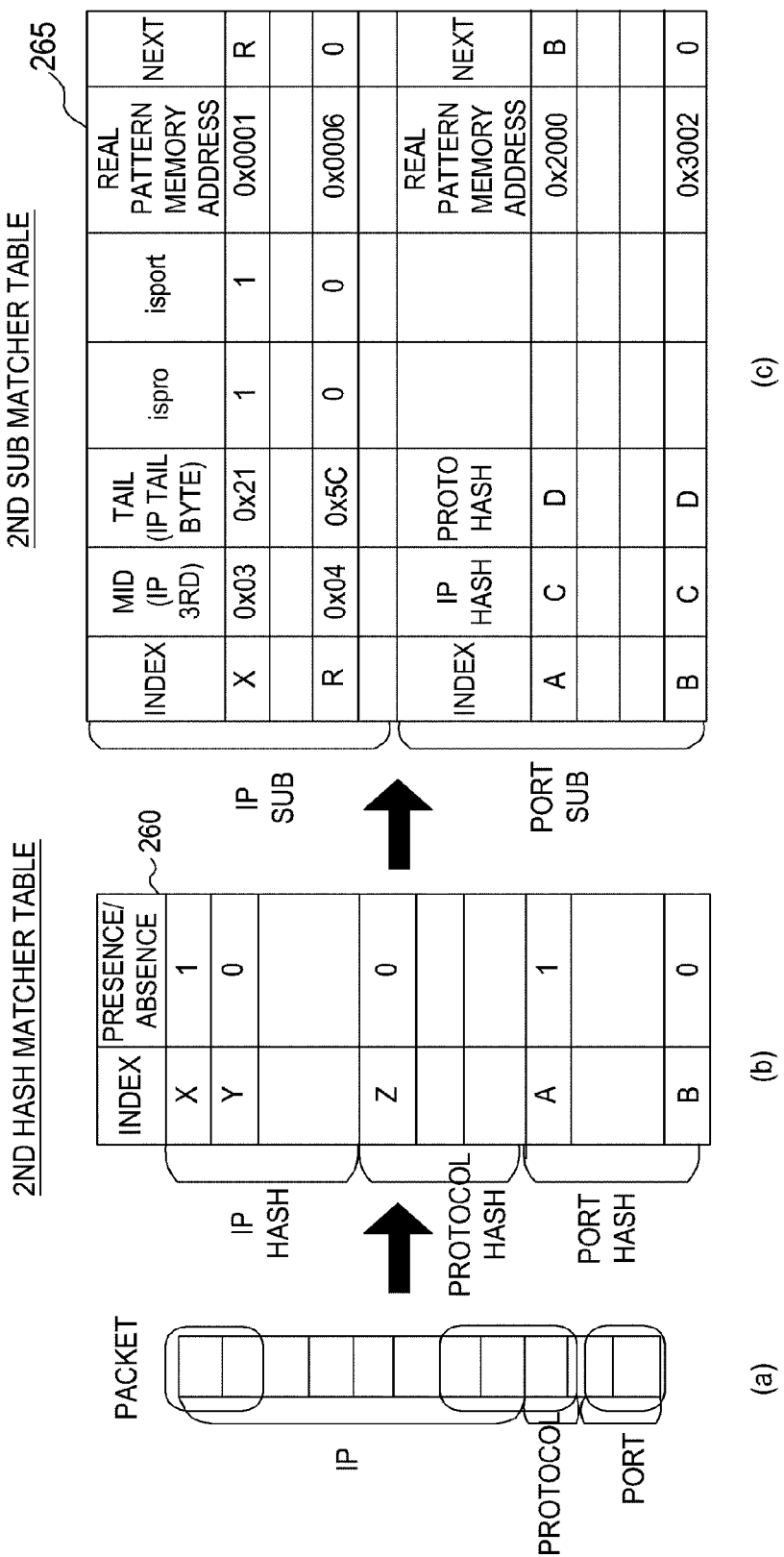
FIG. 6 is a second hash matcher table and a second sub matcher table.

FIG. 6 is the second hash matcher table 260 and the second sub matcher table 265.

The hash value generating unit 220 may create a first hash function by applying a rule hash coefficient received from the server 100 to a previous hash function. The hash value generating unit 220 may generate the hash values $H_R$ for the rule pattern data by inputting values of at least a part of the rule pattern data stored in the pattern DB 210 into the first hash function. This is similar to the generation of the hash values $H_R$ described with reference to FIG. 3.

If the hash values $H_R$ for all pieces of the rule pattern data are generated, the hash value generating unit 220 may generate a rule pattern hash value table (not shown). The rule pattern hash value table (not shown), which is a table that maps the hash values $H_R$ generated by the hash value generating unit 220 and a pattern of the rule pattern data corresponding to the hash values $H_R$, may be loaded on a memory (not shown).

If the hash values $H_R$ for all pieces of the rule pattern data are generated, the table generating unit 240 may generate the second hash matcher table 260 and the second sub matcher table 265 based on the hash value table of the rule pattern (not shown).

Referring to FIG. 6, the second hash matcher table 260 includes an index (key values) and an item indicating presence/absence. The table generating unit 240 may determine all the hash values $H_R$ that can be generated from the first hash function as indices. The table generating unit 240 may generate the second hash matcher table 260 by comparing the hash values $H_R$ generated from the rule pattern data with all indices. In the second hash matcher table 260, a value 1 of the item indicating presence/absence means that there is the same index as the hash value $H_R$, and a value 0 of the item indicating presence/absence means that there is no index the same as the hash value $H_R$. This is similar to the generation of the first hash matcher table 250 described with reference to FIG. 4.

1 is indicated in the index X of the second hash matcher table 260, and thus X is present in the hash values $H_R$ for all pieces of the rule pattern data.

The table generating unit 240 may generate the second sub matcher table 265 by using a hash value table of the rule pattern (not shown) and the second hash matcher table 260.

The table generating unit 240 may generate the second sub matcher table 265 with respect to indices (including X and A) identical to the hash values $H_R$ among all indices of the second hash matcher table 260. The indices identical to the hash values $H_R$ among all indices are hereinafter referred to as matching indices.

The second sub matcher table 265 includes subs only for an IP and a port. Each sub has different values.

The IP sub includes an index, a middle value mid, a tail value tail, presence/absence ispro of a rule pattern applied to all protocols, presence/absence isport of a rule pattern applied to all ports, a substantial pattern memory address, a next address next, and the like.

The port sub includes an index, an IP hash value, a protocol hash value proto hash, a substantial pattern memory address, a next address next, and the like.

The middle value mid of the IP sub has a third byte value of an IP address, and the tail value thereof has a last byte value of the IP address. Such a byte position selection may enable to perform authentication on an Internet Protocol (IP) address of IPv4 by using a head 2 bytes, a middle value and a tail value of the IP in a hash matcher 270. The middle value and the tail value of the rule pattern data corresponding to the matching indices may be acknowledged from headers of packets that are the rule pattern data.

An ispro value indicates the presence/absence ispro of the rule pattern applied to all protocols. If one protocol is ALL among substantial rule patterns of a corresponding index value, the ispro value has 1, and, if not, the ispro value has 0.

The ispro may allow a reconstruction of a scope of flags (IP, Protocol, Port) in accordance with a rule of a corresponding IP. For example, if there are two rule patterns such as [in, 202.131.29.71, TCP, 80, Allow] and [in, 202.131.29.70, ALL, 80, Allow], the flags are set as Not all, ALL, and Not all. In this regard, since 202.131.29.71 does not have a rule pattern that is ALL for Protocol, the ispro becomes 0, which changes the flag Protocol to Not all later.

An isport value indicates the presence/absence isport of the rule pattern applied to all ports. If one port is ALL among substantial rule patterns of a corresponding index value, the isport value has 1, and, if not, the isport value has 0. This is similar to a function of the ispro value.

The substantial pattern memory address has an address value of a memory in which corresponding rule data is substantially stored. The next address next is a value necessary for searching for a next pattern sub when various rule patterns are focused in one hash value that is an index of the second sub matcher table 265. The next address next is similar to an offset of a collision pattern of the first sub matcher table 255.

In the exemplary embodiments, an IP hash value of the port sub and a hash value of the protocol are used to give connections between a port, an IP, and a protocol of a corresponding rule. If the port, the IP, and the protocol have no connection, the entire rule patterns must be searched with respect to the port.

Referring back to FIG. 1, the hash value generating unit 220 may receive target data that is to be filtered, further generate hash values $H_F$ for the target data, and provide the matching unit 280 with the hash values $H_F$. The hash value generating unit 220 may generate the hash values $H_F$ for each of various types of information such as an IP address, a port, a protocol, etc. of a packet of the target data.

If the second hash matcher table 260 and the second sub matcher table 265 are generated, the hash matcher unit 270 may receive the hash values $H_F$ for the target data from the hash value generating unit 220. The hash matcher unit 270 may match matching indices (for example, X and A) of the second mash matcher table 260 in which 1 is indicated and the hash values $H_F$ for the target data.

If matching is successful by the hash matcher unit 270, the matching unit 280 may match patterns of the rule pattern data corresponding to a matching indices (for example, X) identical to the hash values $H_F$ and the target data and perform filtering. For the pattern matching, the matching unit 280 may use LPM and EPM based on the second sub matcher table 265. This is the same as described in the pattern matching of the virus pattern data, and thus a detailed description thereof will not be repeated here. The hash matcher unit 270 and the matching unit 280 may be implemented in a hardware logic way. If the patterns of the rule pattern data and the target data are identical to each other through the pattern matching, the target data can be blocked. Meanwhile, referring back to FIG. 1, if the first malware pattern data is updated, i.e., if there is the update malware pattern data, the first hash coefficient and the first hash function may be changed based on the characteristics of the update malware pattern data. This is because the server 100 regenerates a hash coefficient based on a minimum hash collision result through a hash function for the update malware pattern data. The regenerated hash coefficient or the changed first hash function is the second hash coefficient stated above. Thus, the second hash coefficient provided from the server 100 is included in the update malware pattern data.

When the hash value generating unit 220 receives the update malware pattern data from the server 100, the hash value generating unit 220 may regenerate a hash value by using the second hash coefficient transmitted together with the update malware pattern data. That is, the hash value generating unit 220 may regenerate the hash value by using the second hash function having the second hash coefficient transmitted from the server 100 together with the update malware pattern data. Thus, the update malware pattern DB including the update malware pattern data may include the header item 310 in which the header information is written and the hash item 320 in which the second hash coefficient is written. Also, the update malware pattern data may be added to the pattern DB 210. Thereafter, operations of the hash value generating unit 220, the table generating unit 240, the hash matcher unit 270, and the matching unit 280 are similar to those of inputting the first malware pattern data, and thus detailed descriptions thereof will be omitted here.

According to the exemplary embodiments described above, the server 100 may transmit malware pattern data including hash coefficients to the anti-malware device 200. The anti-malware device 200 may determine hash functions by using the hash coefficients received from the server 100 and perform pattern matching.

Figure 7:
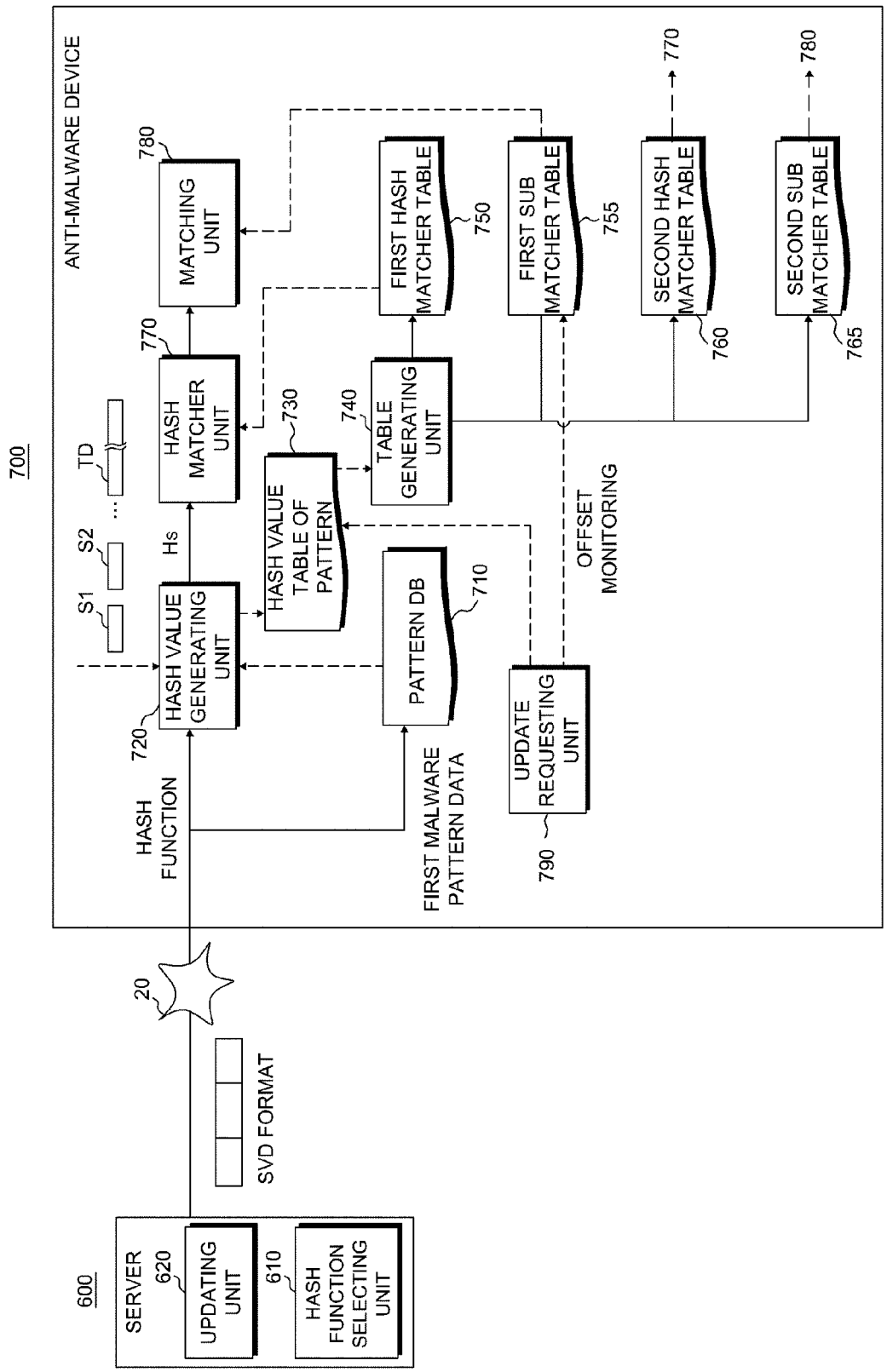
FIG. 7 is a block diagram of an anti-malware system according to another exemplary embodiment.

FIG. 7 is a block diagram of an anti-malware system according to another exemplary embodiment.

Referring to FIG. 7, the anti-malware system includes a server 600 and an anti-malware device 700. The server 600 and the anti-malware device 700 may be connected to each other over a network 20 to perform communication. The server 600 and the anti-malware device 700 of FIG. 7 are similar to the server 100 and the anti-malware device 200 described with reference to FIGS. 1 through 6, and detailed descriptions thereof will be skipped here.

However, the server 100 of FIG. 1 selects the hash coefficients and transmits the hash coefficients to the anti-malware 200, whereas the server 600 may select hash functions to which hash coefficients are applied and transmit the hash functions to the anti-malware device 700. The anti-malware device 700 may generate hash values of first malware pattern data and hash values of target data by using the received hash functions.

To this end, the server 600 of the present exemplary embodiment includes a hash function selecting unit 610 and an updating unit 620.

The hash function selecting unit 610 may select a function that can detect and quickly search for entire pattern data from an anti-malware engine with respect to first malware pattern data, select an optimal coefficient value for the selected function as a hash coefficient, and determine a first hash function to be transmitted to the anti-malware device 700.

For example, the hash function selecting unit 610 selects a function that can detect and quickly search for an optimal pattern among various hash functions with respect to the first malware pattern data. The hash function selecting unit 610 may select a first hash coefficient by using an algorithm used by the hash coefficient selecting unit 110 of FIG. 1, update the first hash coefficient to a given hash function, and select the first hash function.

Alternatively, the hash function selecting unit 610 may select the first hash coefficient by using the variance value calculated by the hash coefficient selecting unit 110 of FIG. 1, update the first hash coefficient to the given hash function, and select the first hash function.

If there is data used to update the first malware pattern data, the hash function selecting unit 610 may reselect a second hash function by using new update malware pattern data and the first malware pattern data transmitted to the anti-malware device 700.

When the updating unit 620 transmits the first malware pattern data to the anti-malware device 700, the updating unit 620 may transmit the selected first hash function and the malware pattern data. The first hash function may be used to generate the hash values of the first malware pattern data transmitted to the anti-malware device 700.

If the server 600 receives a request from the anti-malware device 700, the server 600 transmits an update hash function together with necessary update malware pattern data to the anti-malware device 700.

According to an exemplary embodiment, if the first malware pattern data transmitted from the server 600 to the anti-malware device 700 is the virus pattern data, the first hash function transmitted together with the virus pattern data may be a virus hash function. Also, if the first malware pattern data transmitted from the server 600 to the anti-malware device 700 is the rule pattern data, the first hash function transmitted together with the rule pattern data may be a rule hash function. If the first malware pattern data transmitted from the server 600 to the anti-malware device 700 includes the virus pattern and the rule pattern data, the first hash function transmitted together with the virus pattern data and the rule pattern data may include the virus hash function and the rule hash function.

Meanwhile, according to another exemplary embodiment, the anti-malware device 700 may include a pattern DB 710, a hash value generating unit 720, a hash value table of the pattern 730, a table generating unit 740, a first hash matcher table 750, a first sub matcher table 755, a second hash matcher table 760, a second sub matcher table 765, a hash matcher unit 770, a matching unit 780, and an update requesting unit 790.

The pattern DB 710, the hash value table of the pattern 730, the table generating unit 740, the first hash matcher table 750, the first sub matcher table 755, the second hash matcher table 760, the second sub matcher table 765, the hash matcher unit 770, and the matching unit 780 of FIG. 7 are the same as the pattern DB 210, the hash value table of the pattern 230, the table generating unit 240, the first hash matcher table 250, the first sub matcher table 255, the second hash matcher table 260, a second sub matcher table 265, the hash matcher unit 270, and the matching unit 280 of FIG. 1.

However, the hash value generating unit 720 generates hash values of the first malware pattern data and hash values of sub data by using the first hash function received from the server 600. For example, if the first malware pattern data is the virus pattern data, the hash value generating unit 720 generates hash values for the virus pattern data by using the virus hash function.

If the number of collisions between the hash values for the first malware pattern data generated by the hash value generating unit 720 exceeds a reference value, the update requesting unit 790 may request the server 600 to update the first hash coefficient or the first hash function. The update requesting unit 790 may also request the server 600 to update the first malware pattern data and the first hash coefficient as well. The update requesting unit 790 may be selectively included in the anti-malware device 700.

The update requesting unit 790 may monitor the first sub matcher table 755 and count the number of hash collisions. For example, the update requesting unit 790 may use the number of matching indices written in a collision pattern offset item of the first sub matcher table 755 as the number of hash collisions. Alternatively, the number of hash collisions may be counted by a counter (not shown).

According to another exemplary embodiment, the server 600 may transmit the malware pattern data including the hash function to the anti-malware device 700. The anti-malware device 700 may generate the hash values by using the hash function received from the server 600 and perform pattern matching.

Figure 8:
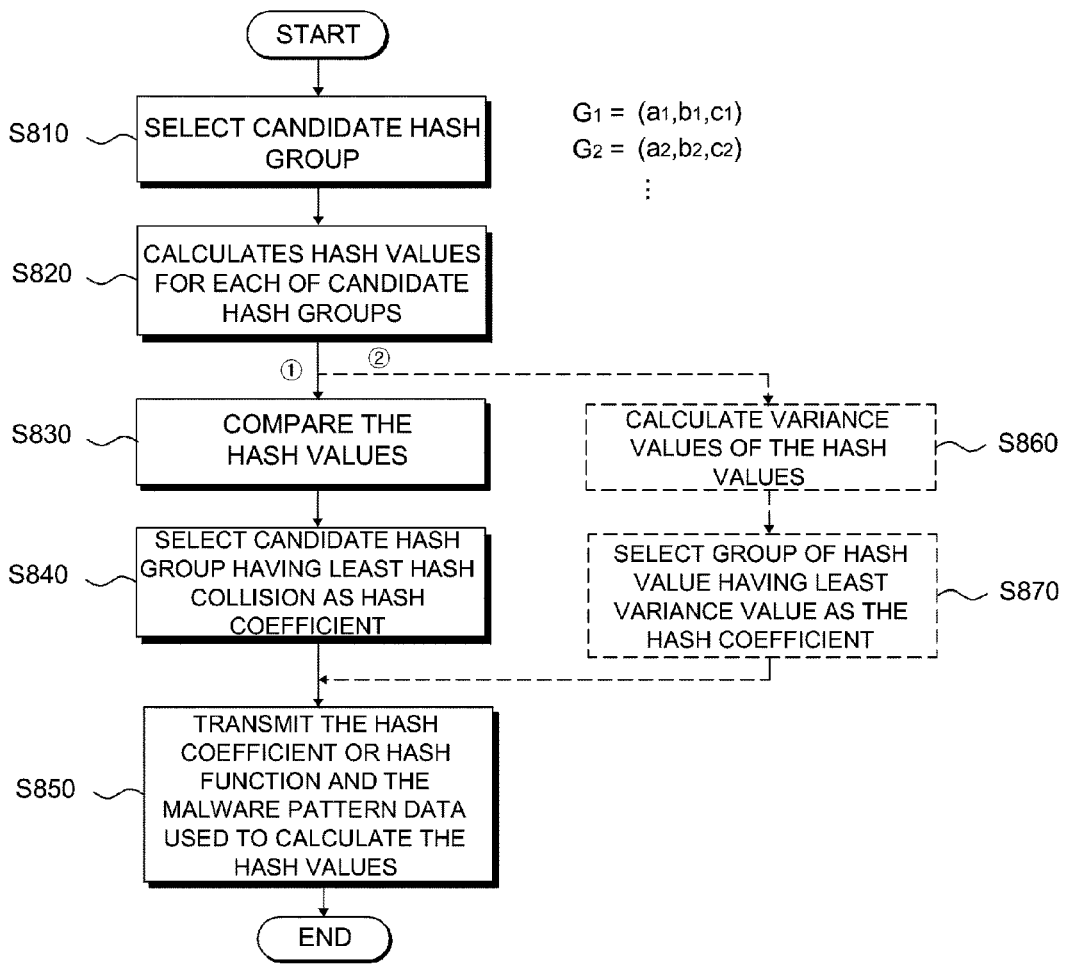
FIG. 8 is a flowchart illustrating an operation of a server in a malware pattern matching method according to an exemplary embodiment.

FIG. 8 is a flowchart illustrating an operation of a server in a malware pattern matching method according to an exemplary embodiment.

Referring to FIG. 8, the operation may be performed by any one of the servers 100 and 600 described with reference to FIG. 1 or 7.

In operation S810, the server may select the candidate hash groups $G_N$ (N=1, 2, ... ). For example, the first candidate hash group $G_1$ may include candidate hash coefficients as $a_1, b_1, c_1$, and the second candidate hash group $G_2$ may include candidate hash coefficients as $a_2, b_2, c_2$.

In operation S820, the server may calculate hash values for each of the candidate hash groups $G_N$. That is, the server may calculate hash values for each of the candidate hash groups $G_N$ by applying the candidate hash coefficients of the candidate hash groups $G_1, G_2, \ldots$ to a hash function. In this regard, the server may calculate the hash values by substituting malware pattern data being used by an anti-malware device for the hash function.

In operation S830, the server may compare the hash values calculated for each of the candidate hash groups $G_1, G_2, \ldots$ and acknowledge the number of hash collisions for each of the candidate hash groups $G_1, G_2, \ldots$.

In operation S840, the server may acknowledge the candidate hash group having the least hash collision and select the hash coefficient of the acknowledged candidate hash group as a hash coefficient to be transmitted to the anti-malware device.

In operation S850, the server may transmit the hash coefficient selected in operation S840 and the malware pattern data used to calculate the hash values in operation S820 to the anti-malware device.

Meanwhile, if the server selects the hash coefficient by using a variance value, the server may perform operations S860 and S870 instead of operations S830 and S840.

In operation S860, the server may calculate variance values of the hash values calculated in operation S820 for each of the candidate hash groups $G_1, G_2, \ldots$.

In operation S870, the server may acknowledge the candidate hash group having a minimum variance value among the variance values calculated for the candidate hash groups and select the hash coefficient of the acknowledged candidate hash group as a hash coefficient to be transmitted to the anti-malware device.

As described above, the server may select the hash coefficient that minimizes a probability of collisions between the hash values obtained when the malware pattern data is applied to the hash function. If the malware pattern data is virus pattern data, the server may select a virus hash coefficient in terms of the virus pattern data, and if the malware pattern data is rule pattern data, the server may select a rule hash coefficient in terms of the rule pattern data.

Figure 9:
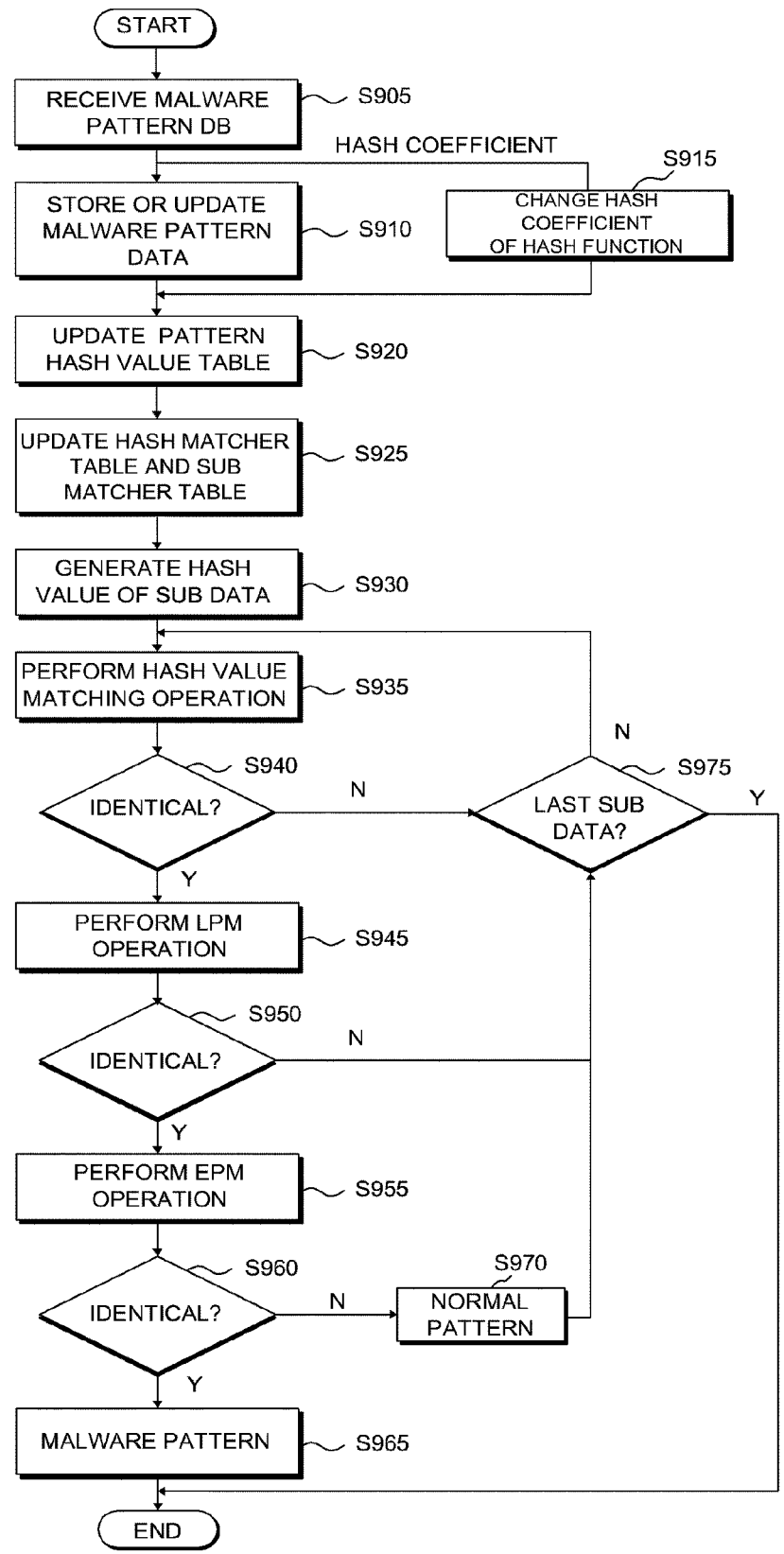
FIG. 9 is a flowchart of a malware pattern matching method of an anti-malware device according to an exemplary embodiment.

FIG. 9 is a flowchart of a malware pattern matching method of an anti-malware device according to an exemplary embodiment.

The malware pattern matching method of FIG. 9 may be performed by one of the anti-malware devices 200 and 700 described with reference to FIG. 1 or 7.

In operation S905, the anti-malware device may receive a malware pattern DB from a server. The malware pattern DB includes malware pattern data used for pattern matching to determine whether target data is infected with malware and hash coefficients. If the malware pattern data received in operation S905 is virus pattern data for virus scanning, the hash coefficients may be virus hash coefficients selected in terms of the virus pattern data. Also, if the malware pattern data received in operation S905 is rule pattern data, the hash coefficients may be rule hash coefficients selected in terms of the rule pattern data. Also, if the malware pattern data received in operation S905 includes both of the virus pattern data and the rule pattern data, the hash coefficients may include the virus hash coefficients and the rule hash coefficients.

In operation S910, the anti-malware device stores or updates the received malware pattern data in a pattern DB.

In operation S915, the anti-malware device may change a hash coefficient of a hash function to the received hash coefficient.

In operation S920, the anti-malware device may substitute the malware pattern data for the hash function to which the received hash coefficient is applied, generate hash values for the malware pattern data, and update a hash value table of the pattern by using the generated hash values. If there is no hash value table of the pattern, the anti-malware device may newly generate a hash value table of the pattern by using the generated hash values.

In operation S925, the anti-malware device may update a hash matcher table and a sub matcher table based on the hash value table of the pattern. If there are no hash matcher table and sub matcher table, the anti-malware device may newly generate a hash matcher table and a sub matcher table. This was described in detail with reference to FIGS. 4 and 5.

In operation S930, the anti-malware device may generate a hash value for sub data by receiving the target data in a sub data unit. The anti-malware device may generate the hash value for the sub data by substituting the sub data for the hash function updated in operation S915.

In operation S935, the anti-malware device performs a matching operation on the hash value for the sub data. That is, the anti-malware device may match the generated hash value for the sub data to matching indices (i.e. indices of the hash matcher table in which 1 is indicated) of the hash matcher table.

In operation S940, the anti-malware device may determine whether one of the matching indices is identical to the hash value for the sub data.

If one of the matching indices is identical to the hash value for the sub data in operation 5940-Y, the anti-malware device may perform an LPM operation. LPM is a method of matching patterns by using the malware pattern data and a middle value and a tail value of the sub data.

In operation S950, the anti-malware device may determine whether the malware pattern data and the middle values of the sub data are identical and the malware pattern data and the tail values of the sub data are identical.

If the malware pattern data and the middle values and the tail values of the sub data are identical in operation S950-Y, the anti-malware device may perform an EPM operation. EPM is a method of matching patterns by using values of all locations of the malware pattern data and the sub data.

In operation S960, the anti-malware device may determine whether the malware pattern data and the entire sub data are wholly identical.

If the malware pattern data and the entire sub data are identical in operation S960-Y, in operation S965, the anti-malware device may determine that the sub data corresponds to a malware pattern.

Meanwhile, if the malware pattern data and the entire sub data are not wholly identical in operation S960-N, in operation S975, the anti-malware device may determine that the sub data corresponds to a normal pattern.

Meanwhile, if one of the matching indices is not identical to the hash values for the sub data in operation S940-N, and if the malware pattern data and the middle values and the tail values of the sub data are not identical in operation S950-N, in operation S975, the anti-malware device determines whether currently processed sub data is last sub data of the target data.

If the currently processed sub data is not the last sub data of the target data, the anti-malware device performs pattern matching on next sub data in operation S935.

Figure 10:
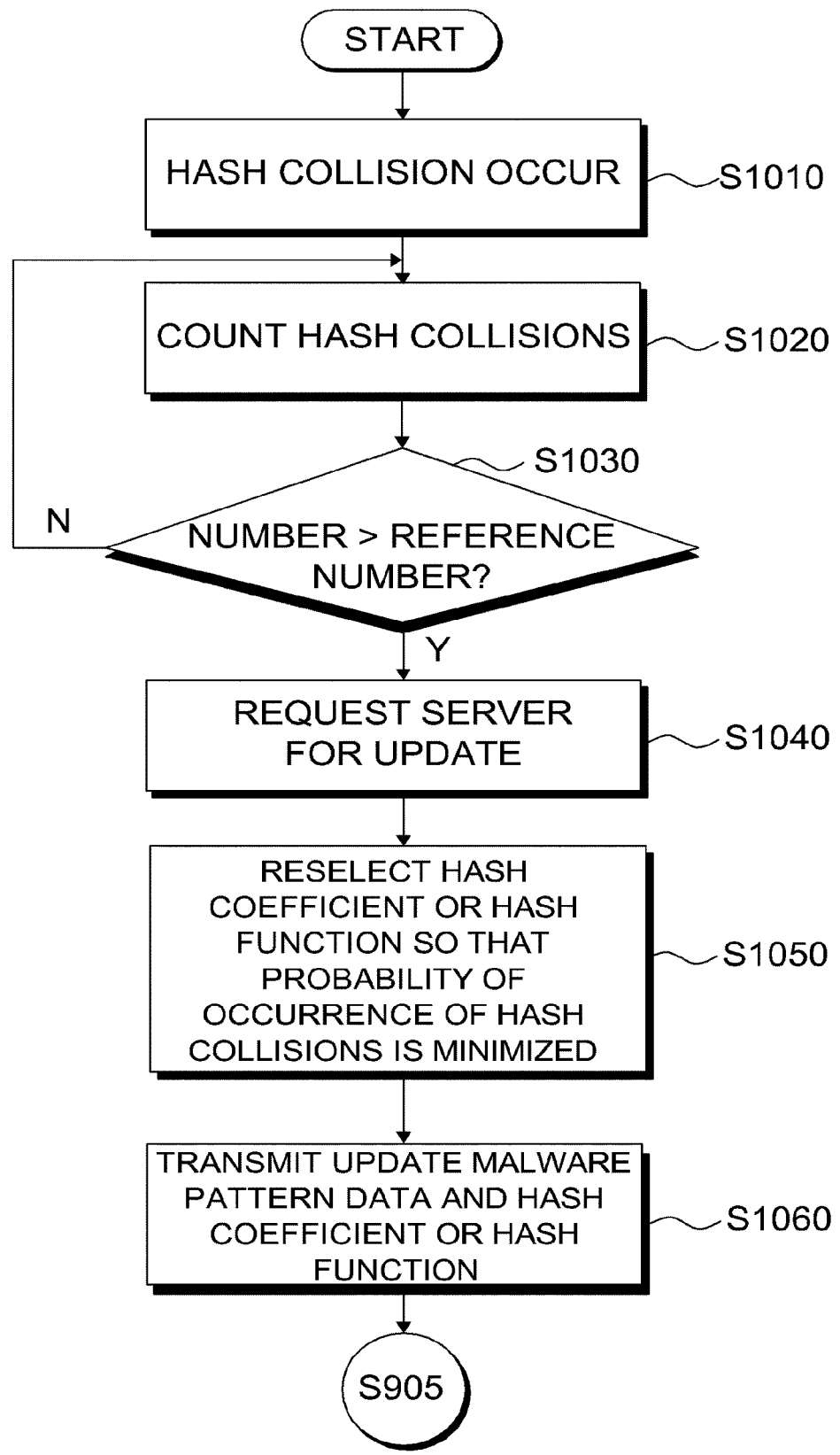
FIG. 10 is a flowchart of an update operation of a malware pattern matching method of an anti-malware device according to an exemplary embodiment.

FIG. 10 is a flowchart of an update operation of a malware pattern matching method of an anti-malware device according to an exemplary embodiment.

The update operation of FIG. 10 may be performed by one of the anti-malware devices 200 and 700 and one of the servers 100 and 600 described with reference to FIG. 1 or 7.

In operation S1010, if a hash collision occurs, in operation S1020, the anti-malware device may count or acknowledge the number of hash collisions. The anti-malware device may count the number of collisions between the hash values for the malware pattern data generated in operation S920. The anti-malware device may be informed of the number of hash collisions from the number of collision pattern offsets of the sub matcher table generated in operation S925.

In operation S1030, the anti-malware device may compare the number of hash collisions acknowledged in operation S1020 with a reference value.

If the number of hash collisions acknowledged in operation S1020 exceeds the reference value in operation 51030-Y, in operation S1040, the anti-malware device may request the server to update the malware pattern data and the hash coefficient.

In operation S1050, the server may reselect a hash coefficient or a hash function that minimizes a probability of occurrence of the hash collision according to a request of the anti-malware device. The server may reselect the hash coefficient or the hash function based on the previously referred malware pattern data or update malware pattern data. This may be similar to the operation described with reference to FIG. 8.

In operation S1060, the server may transmit the update malware pattern data referred in operation S1050 and the reselected hash coefficient or hash function to the anti-malware device.

Figure 11:
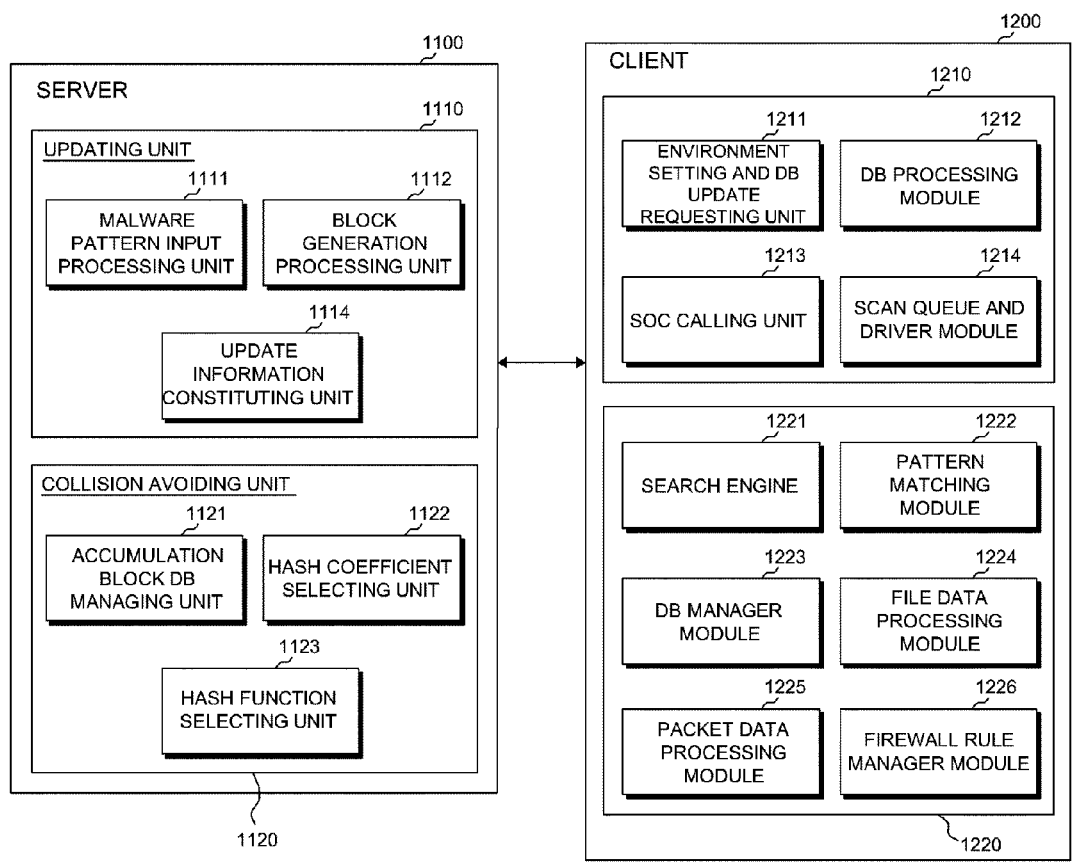
FIG. 11 is a block diagram of an anti-malware system according to another exemplary embodiment.

FIG. 11 is a block diagram of an anti-malware system according to another exemplary embodiment.

Referring to FIG. 11, the anti-malware system includes a server 1100 and a client 1200.

The server 1100 updates a malware pattern DB, calculates a hash coefficient that prevents a hash collision from occurring in an operation of detecting a malware in the client 1200, and transmits the calculated hash coefficient to the client 1200. The server 1100 may be one of the servers 100 and 600 described with reference to FIGS. 1 and 7 or operate similarly to the servers 100 and 600. The malware pattern DB may be the malware pattern DB described with reference to FIGS. 1 and 7.

The client 1200 may download the malware pattern DB from the server 1100 and detect whether the target data is infected with malware. The client 1200 may be one of the anti-malware devices 200 and 700 described with reference to FIGS. 1 and 7 or operate similarly to the anti-malware devices 200 and 700. However, the client 1200 may be implemented in an SOC.

In the present exemplary embodiment, if the server 1100 receives an update request from the client 1200, the server 1100 may transmit the hash coefficient and necessary update information to the client 1200. The necessary update information may include the hash coefficient calculated by the server 1100 or a hash function and malware pattern data.

The server 1100 includes an updating unit 1110 for updating the malware pattern DB and a collision avoiding unit 1120 for calculating the hash coefficient.

The updating unit 1110 may additionally provide a function performed by at least one of the updating units 120 and 620 of FIGS. 1 and 7. The updating unit 1110 includes a malware pattern input processing unit 1111, a block generation processing unit 1112, and an update information constituting unit 1114.

The malware pattern input processing unit 1111 processes an input of the malware pattern data to be transmitted to the client 1200.

The block generation processing unit 1112 generates a block. The update information constituting unit 1114 constitutes update information. For example, the update information constituting unit 1114 may constitute the update information, i.e. the malware pattern DB, by writing one of a hash coefficient selected by a hash coefficient selecting unit 1122 and a hash function selected by a hash function selecting unit 1123 in the hash item 320, and writing the malware pattern data in the data item 330.

The collision avoiding unit 1120 includes an accumulation block DB 1121, a hash coefficient selecting unit 1122, and a hash function selecting unit 1123. The accumulation block DB 1121 stores accumulation block information. The hash coefficient selecting unit 1122 selects the hash coefficient. The hash function selecting unit 1123 selects the hash function.

The hash coefficient selecting unit 1122 may perform the function of the hash coefficient selecting unit 110 of FIG. 1. That is, the hash coefficient selecting unit 1122 may select the hash coefficient to be transmitted to the client 1200 based on a minimum hash collision result through the hash function for the malware pattern data. For example, the hash coefficient selecting unit 1122 may select the hash coefficient by using an algorithm that minimizes a probability of collisions of hash values obtained when the malware pattern data is applied to the hash function. Alternatively, the hash coefficient selecting unit 1122 may select the hash coefficient by using variance values of the hash values obtained when the malware pattern data is applied to the hash function.

The hash function selecting unit 1123 may perform the function of the hash function selecting unit 610 of FIG. 7. That is, the hash function selecting unit 1123 selects the hash coefficient in the same way as used by the hash coefficient selecting unit 1122, and selects the hash function to which the selected hash coefficient is applied.

Meanwhile, the client 1200 includes an anti-malware application unit 1210 and an anti-malware SOC 1220.

The anti-malware application unit 1210 may provide an environment setting and a driver necessary for anti-malware. To this end, the anti-malware application unit 1210 includes an environment setting and DB update requesting unit 1211, a DB processing module 1212, a SOC calling unit 1213, and a scan queue and driver module 1214.

The environment setting and DB update requesting unit 1211 may set an environment for an anti-malware operation and request the server 1100 to update the malware pattern DB. The environment setting and DB update requesting unit 1211 may additionally provide the function of the update requesting unit 790 of FIG. 7.

The DB processing module 1212 may process the malware pattern DB, i.e. the malware pattern data, the hash function, or the hash coefficient. The SOC calling unit 1213 calls an SOC.

The scan queue and driver module 1214 may provide and/or drive various drivers necessary for pattern matching performed by the client 1200.

The anti-malware SOC 1220 detects data infected with malware by using the malware pattern DB. To this end, the anti-malware SOC 1220 includes a search engine 1221, a pattern matching module 1222, a DB manager module 1223, a file data processing module 1224, a packet data processing module 1225, and a firewall rule manager module 1226.

The search engine 1211 is responsible for a search of the malware pattern. The search engine 1211 may be hardware that performs functions of the hash generating units 220 and 720, the table generating units 240 and 740, and the hash matcher units 270 and 770 of FIGS. 1 and 7. Thus, the search engine 1211 may generate hash values of the malware pattern data and hash values of the sub data, generate a hash value table of the pattern, and perform hash value matching.

The pattern matching module 1222 performs pattern matching on the malware pattern data and the sub data. The pattern matching module 1222 may correspond to the matching units 280 and 780 of FIGS. 1 and 7.

The DB manager module 1223 manages the malware pattern DB. For example, the DB manager module 1223 may load the malware pattern data to a memory (not shown) so that the search engine 1211 may generate the hash values.

The file data processing module 1224 processes file data. The packet data processing module 1225 processes packet data. For example, the packet data processing module 1224 may divide the target data into the sub data having a predetermined unit. Each sub data is provided to the search engine 1211 and is used to generate the hash values for the sub data.

The firewall rule manager module 1226 manages a firewall rule.

A method of preventing a hash collision in the anti-malware system having the structure of FIG. 11 is described with reference to FIGS. 12 through 16 below. FIGS. 12 through 16 are flowcharts of the method of preventing the hash collision in the anti-malware system according to an exemplary embodiment. The anti-malware system that performs the method of preventing the hash collision may include the server 1100 and the client 1200 of FIG. 11.

Figure 12:
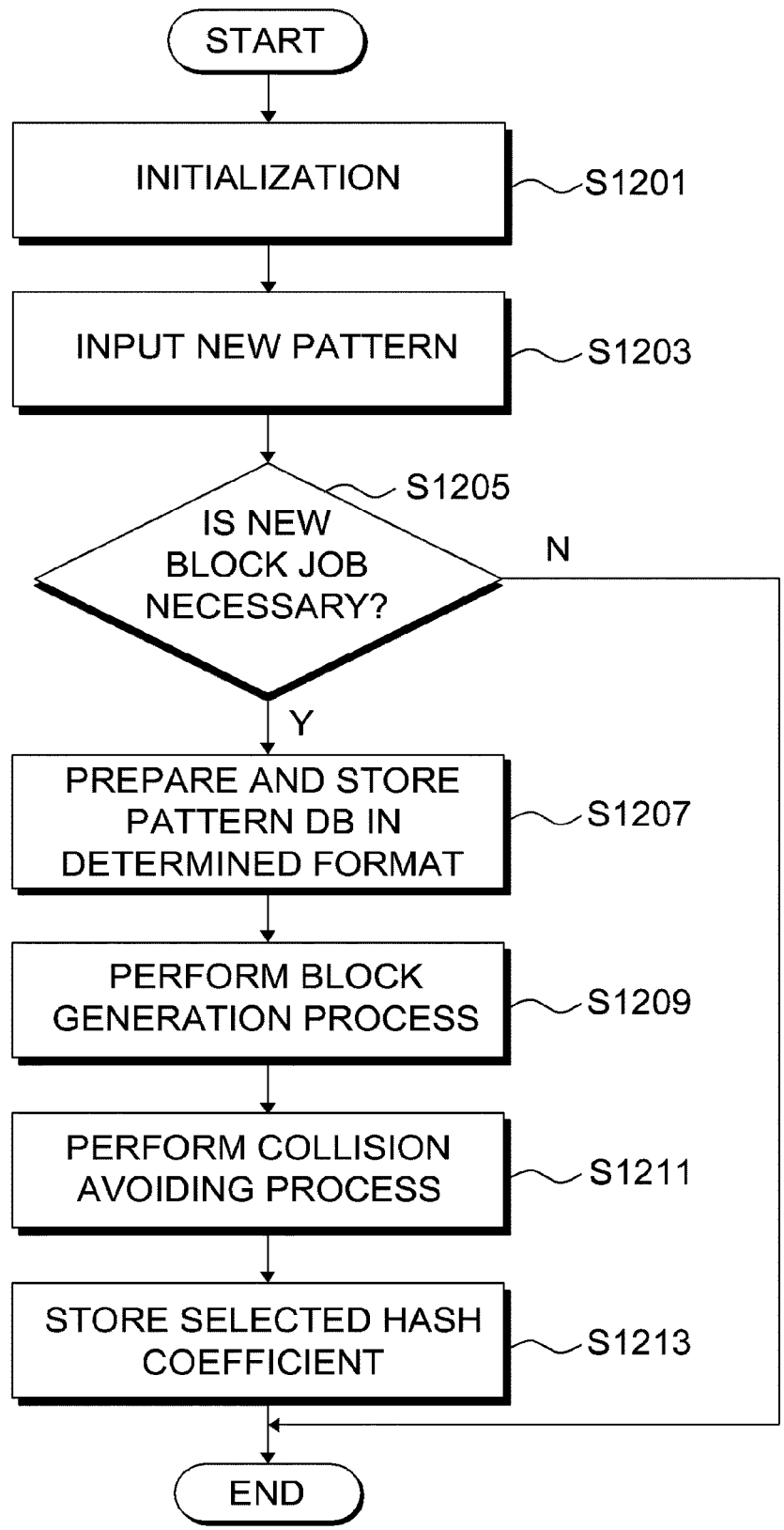
FIG. 12 is a flowchart of a method of preventing a hash collision in an anti-malware system according to an exemplary embodiment.

FIG. 12 is a flowchart of a method of preventing a hash collision in an anti-malware system according to an exemplary embodiment.

Referring to FIG. 12, a server sets and initializes an initial value used for a malware pattern DB block (operation S1201).

If new malware pattern data, i.e. update malware pattern data, is input, the server determines whether a new block job is necessary (operations S1203 and S1205).

If the server determines that the new block job is necessary, the server prepares a malware pattern data DB in a determined format and stores the malware pattern data DB in the malware pattern DB (operation S1207).

The server performs a new block generating process on the malware pattern data and generates a block (operation S1209).

The server performs a collision avoiding process to avoid the hash collision with respect to the block generated in operation S1209 (operation S1211). The server may select a hash coefficient by performing the collision avoiding process. Although not shown in operation S1211, the server may select a hash function by performing the collision avoiding process.

The server stores the hash coefficient or the hash function selected through the collision avoiding process (operation S1213).

Figure 13:
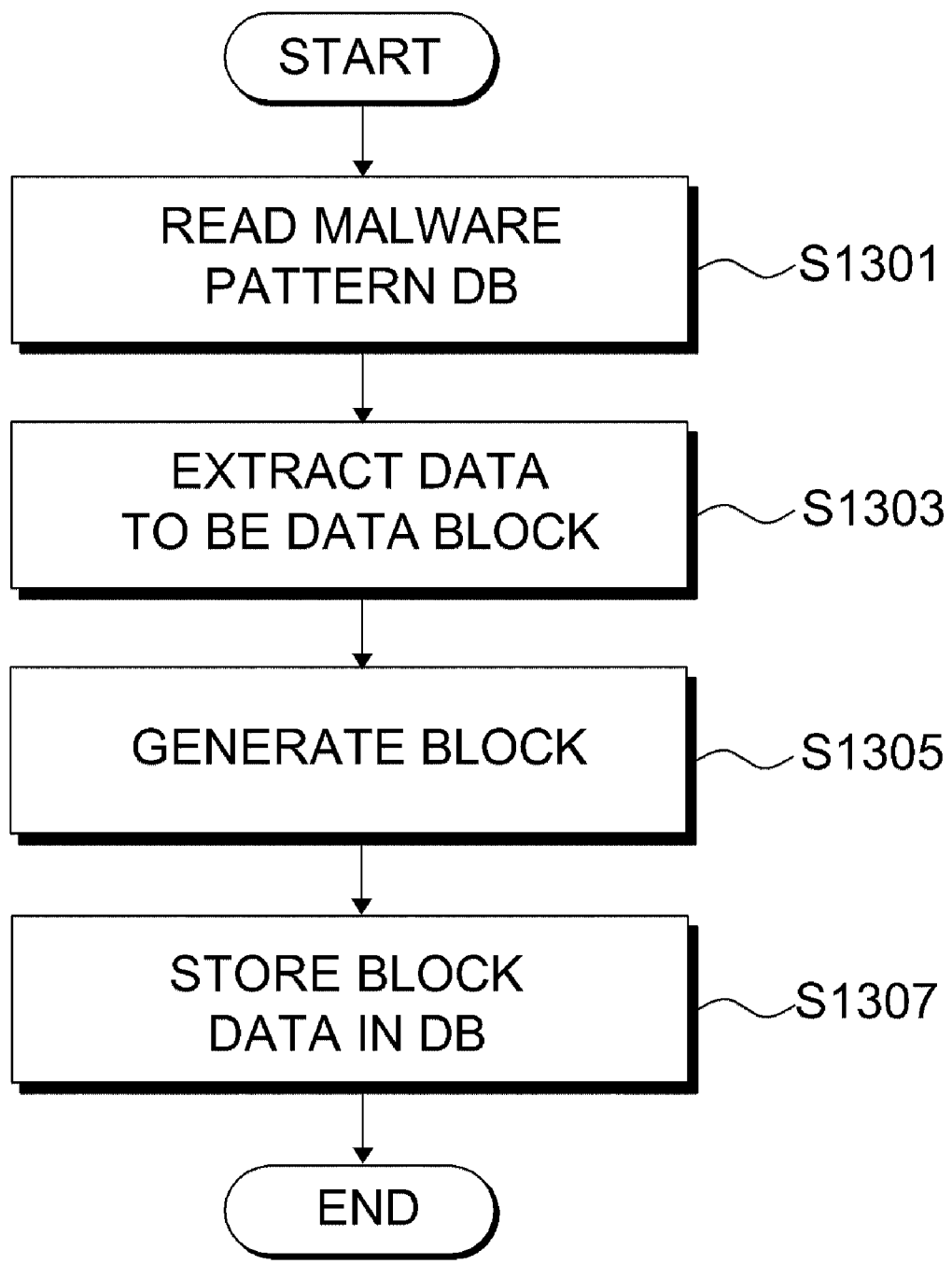
FIG. 13 is a flowchart of an operation of generating a block according to an exemplary embodiment.

FIG. 13 is a flowchart of an operation S1209 of generating a block according to an exemplary embodiment.

Referring to FIG. 13, the server reads the malware pattern data from the malware pattern data DB stored in operation S1207 (operation S1301).

The server extracts data from the malware pattern data (operation S1303). For example, the server may extract a block ID BlockID in a format of locationID_OSID_YYYYMMDD as the data according to a location, OS information, and an input time included in the malware pattern data. If a block ID that is the same as the extracted block ID already exists, the server may upgrade a version of the extracted block data. Thereafter, the server inputs a size and data, an md5 value, whether to use, an input person, and an input time of a corresponding block data.

Then, the server generates the block data by using the data extracted in operation S1303 (operation S1305).

The server stores the generated block data in the malware pattern data DB (operation S1307).

Figure 14:
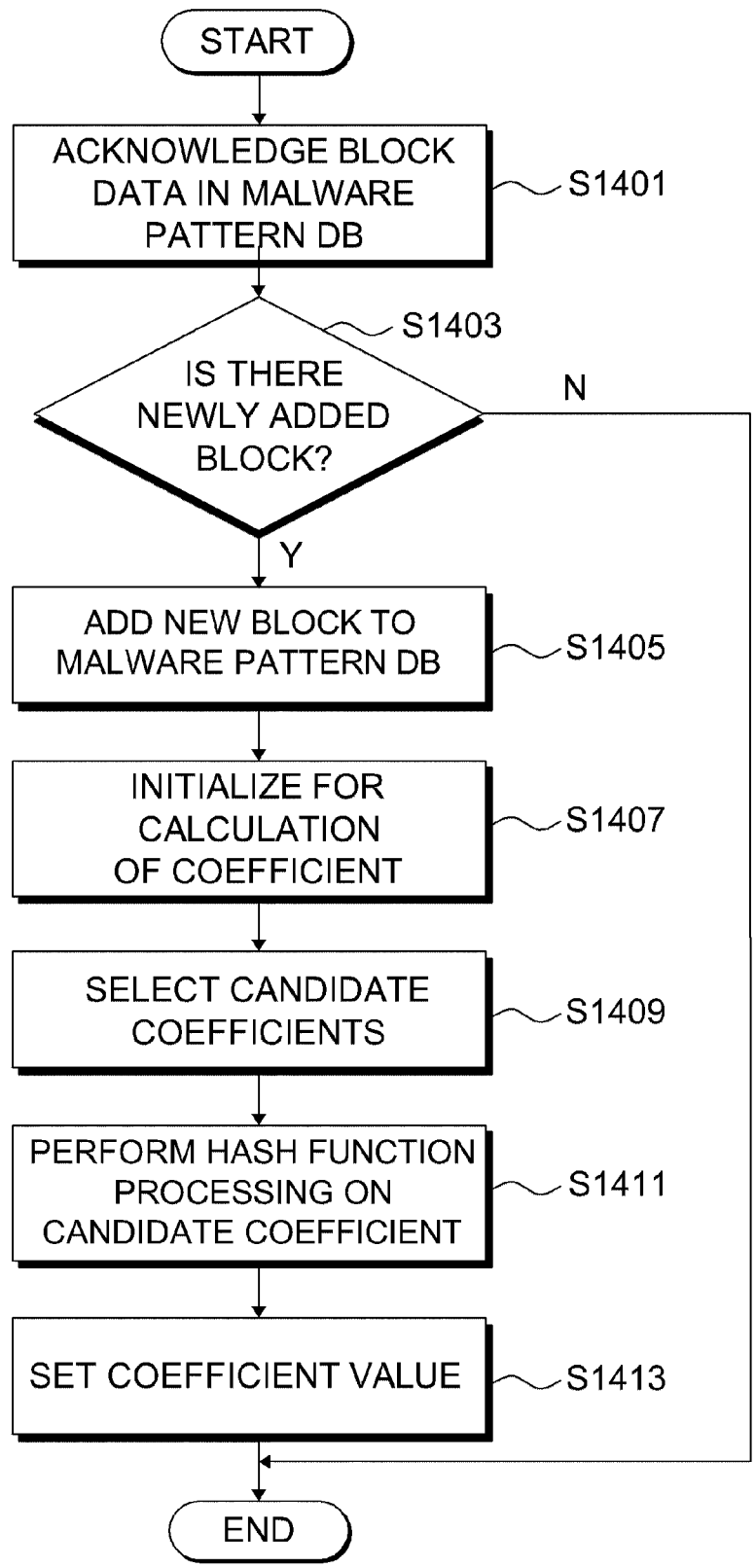
FIG. 14 is a flowchart of an operation of preventing a hash collision according to an exemplary embodiment.

FIG. 14 is a flowchart of an operation S1211 of preventing a hash collision according to an exemplary embodiment.

Referring to FIG. 14, the server acknowledges the block data in the malware pattern DB (operation S1401).

The server determines if a newly added block is included in the block data (operation S1403).

If the server determines that the newly added block is included in the block data, the server adds block data of the newly added block in the malware pattern DB (operation S1405).

The server performs initialization for calculating hash coefficients with respect to the malware pattern data included in the malware pattern DB (operation S1407).

The server selects a plurality of candidate coefficient values (operation S1409). The plurality of candidate coefficient values may be in the form of the plurality of candidate hash groups $G_N$ (N=1, 2, . . . ) each having one or more candidate hash coefficients described with reference to FIG. 1.

The server performs hash function processing on the malware pattern data by using the candidate coefficient values selected in operation S1409 (operation S1411).

The server selects a hash coefficient that minimizes the hash collision by comparing hash function processing results (operation S1413).

Figure 15:
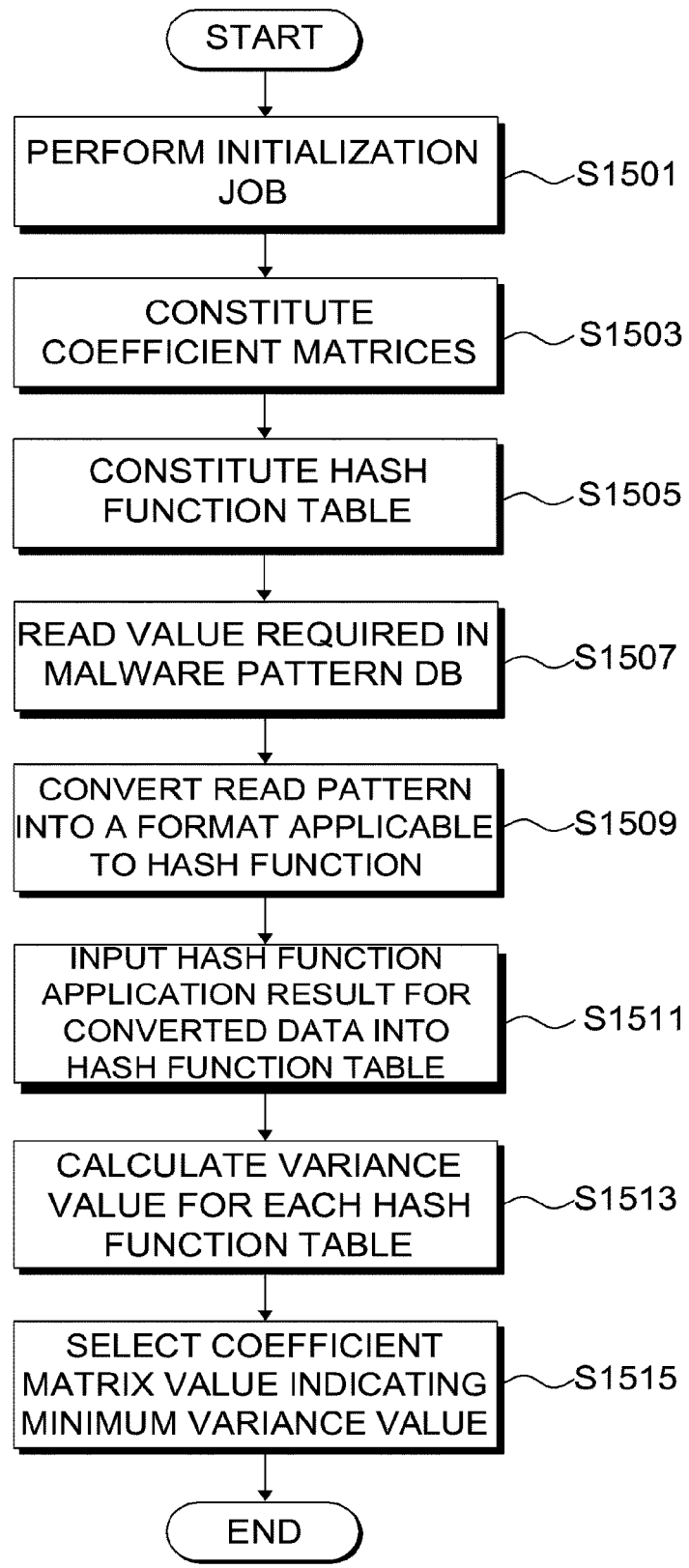
FIG. 15 is a flowchart of an operation of processing a hash function according to an exemplary embodiment.

FIG. 15 is a flowchart of an operation S1411 of processing a hash function according to an exemplary embodiment.

Referring to FIG. 15, the server initializes information including a size of a memory storage place and a range of coefficient values (operation S1501).

The server constructs coefficient matrices and a hash function table (operations S1503 and S1505). The coefficient matrices may be candidate hash groups having the plurality of candidate coefficient values selected in operation S1409. For example, the coefficient matrices may include $G_1=\{a_1, b_1, c_1\}$, $G_2=\{a_2, b_2, c_2\}$, $G_3=\{a_3, b_3, c_3\}$, . . . and be plural.

The server reads the malware pattern data from the malware pattern DB (operation S1507).

The server converts the read malware pattern data into a format to be applied to a hash function (operation S1509).

The server calculates hash values by applying the candidate coefficient values of the coefficient matrices and the converted malware pattern data to the hash function and applies the calculated hash values to the hash function table (operation S1511). In operation S1511, the server calculates the hash values for each candidate hash group and applies the hash values to the hash function table.

The server calculates variance values of values of the hash function table (operation S1513). That is, the server calculates the hash values for each candidate hash group and calculates the variance values of the hash values for each candidate hash group.

Thereafter, the server selects the coefficient matrix indicating the minimum variance value among the variance values calculated from each candidate hash group (operation S1515). The candidate coefficients included in the selected coefficient matrix are hash coefficients to be transmitted to the client.

Meanwhile, the client 1200 requests the server 1100 to update at the update time. In this regard, the client 1200 may transfer a checksum, a device execution environment, location information, a version ID stored therein to the server 1100. The updating unit 1110 determines whether the client 1200 is changed based on the received information, executes a location decider when the client 1200 is changed, and sets an exact location.

Therefore, the server 1100 executes the update information constituting unit 1114 and transmits block information necessary for the client 1200, a job type thereof (append/download/add/delete/replace), update malware pattern data, and hash coefficients reselected according to the update malware pattern data to the client 1200.

The client 1200 that received the corresponding information updates a block thereof based on the block information and the job type, and transfers an update result to the server 1100. The server 1100 stores the update result and completes the operation.

Figure 16:
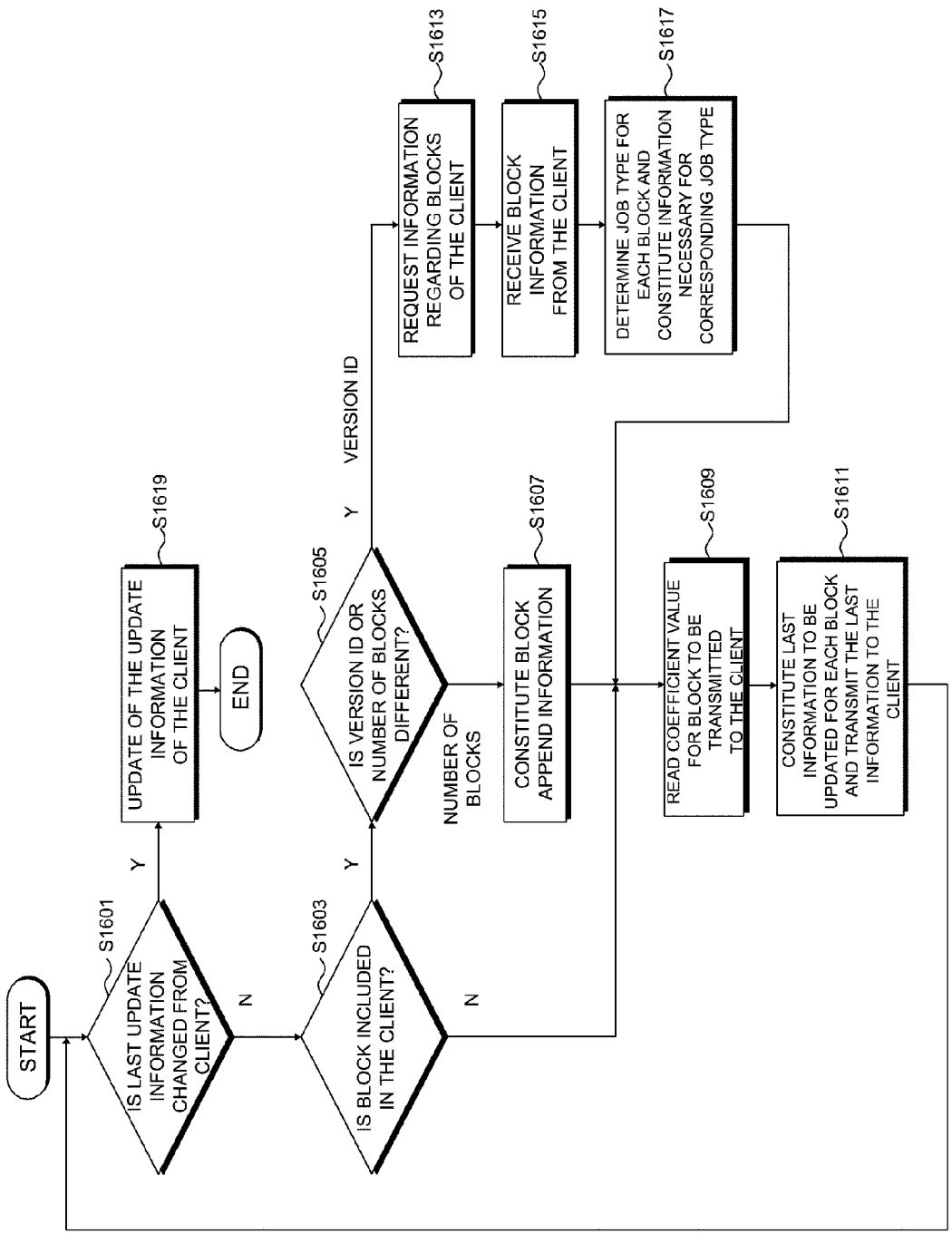
FIG. 16 is a flowchart of an update operation performed by a server according to an exemplary embodiment.

FIG. 16 is a flowchart of an update operation performed by a server according to an exemplary embodiment.

Referring to FIG. 16, the server determines whether last update information is changed from a client (operation S1601).

If the server determines that the last update information is changed, the server updates update information of the client (operation S1619).

If the server determines that the last update information is not changed, the server determines whether the client includes a block (operation S1603).

If the server determines that the client includes the block, the server determines whether a version ID differs or the number of blocks thereof differs with respect to block information (operation S1605).

If the server determines that the version ID differs, the server requests the client for information regarding client blocks (operation S1613).

The server receives the information regarding the client blocks from the client (operation S1615).

The server determines a job type (add/remove/replace/update) for each block and constitutes information necessary for the corresponding job types (operation S1617).

If the server determines that the number of blocks differs in operation S1605, the server constitutes block append information (operation S1607).

The server reads hash coefficients for blocks to be transmitted to the client (operation S1609).

The server constitutes final update information for each block by using the read hash coefficients and transmits the final update information to the client (operation S1611).

Thereafter, the server returns to operation S1601 and repeats the operation.

If the server determines that the client does not include the block, the server directly proceeds with operation S1609.

According to the exemplary embodiments, a server performs a job capable of minimizing a hash collision, constitutes an optimal hash coefficient value, and transfers the optimal hash coefficient value and a signature DB to a client, by a computing environment of the server, thereby solving the conventional problem of a limited memory storage space and computing power of the client.

Accordingly, the client greatly reduces load consumption and expects an increase in the performance only by processing a resultant part.

Further, the hash collision is minimized, thereby quickly processing a pattern detection.

The less the memory accesses, the smaller the hash collisions in a small computer device, thereby reducing battery consumption owing to a fast speed and a small amount of memory.

FIGS. 17 to 20 are views to explain effects of the SOC according to exemplary embodiments.

Figure 17:
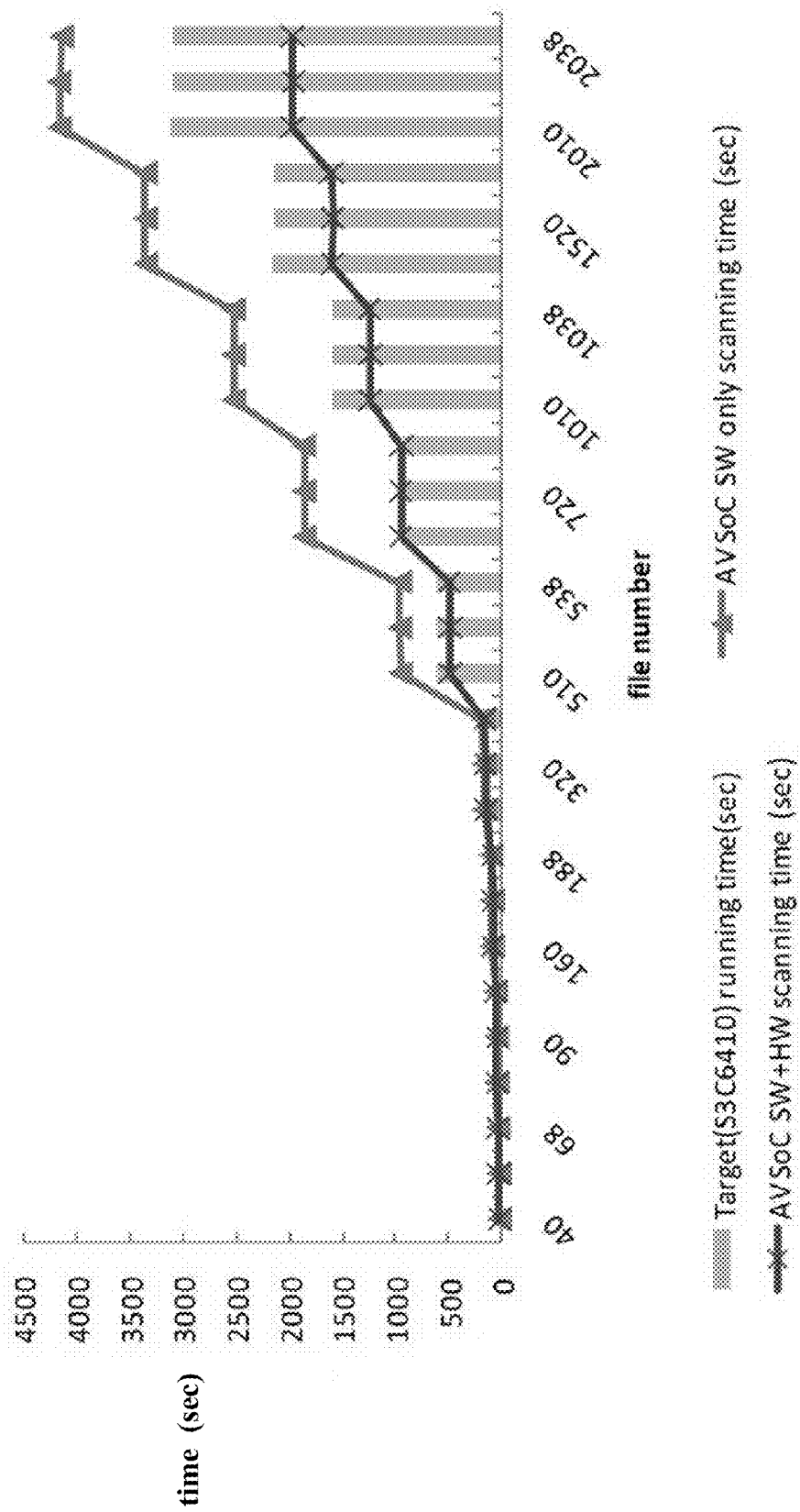
FIGS. 17 to 20 are views to explain effects of the SOC according to exemplary embodiments.

FIG. 17 illustrates a scanning speed when an anti-virus scanning engine using the same algorithm is tested for a malware scanning operation on an application layer (hereinafter, referred to as 'TEST 1') and a scanning speed when a SOC-based anti-virus scanning engine is tested for a malware scanning operation.

In FIG. 17, the scanning speed of TEST 1 is expressed by bars and results of testing the SOC-based anti-virus engine are expressed by curved lines. The lower curved line indicates a result of performing malware scanning using a SOC-based anti-virus engine configured by software and hardware logic (hereinafter, referred to as 'TEST 2'), and the upper curved line indicates a result of performing malware scanning using a SOC-based anti-virus engine configured only by software (hereinafter, referred to as 'TEST 3').

In FIG. 17, TEST 1 uses a CPU of 800 MHz, and TEST 2 and TEST 3, which are done on an FPGA board for a SOC, use a CPU of 50 MHz. Accordingly, if the tests are done using a CPU having the same speed, it is expected that TEST 2 and TEST 3, which are done on the SOC, have much higher scanning speeds than that of TEST 1.

FIG. 17 indicates that TEST 2 requires more time to scan than TEST 1. However, if a difference in the speed of CPUs is considered, it is predicted that the SOC-based anti-malware engine configured only by software requires less time to scan than the anti-malware engine operated on the application layer.

On the other hand, TEST 3 has a higher scanning speed than TEST 1 despite of the difference in the speed of the CPUs. In other words, if the number of files to be scanned exceeds 2,000, the scanning speed of TEST 3 is 1.5 times higher than the scanning speed of TEST 1.

Figure 18:
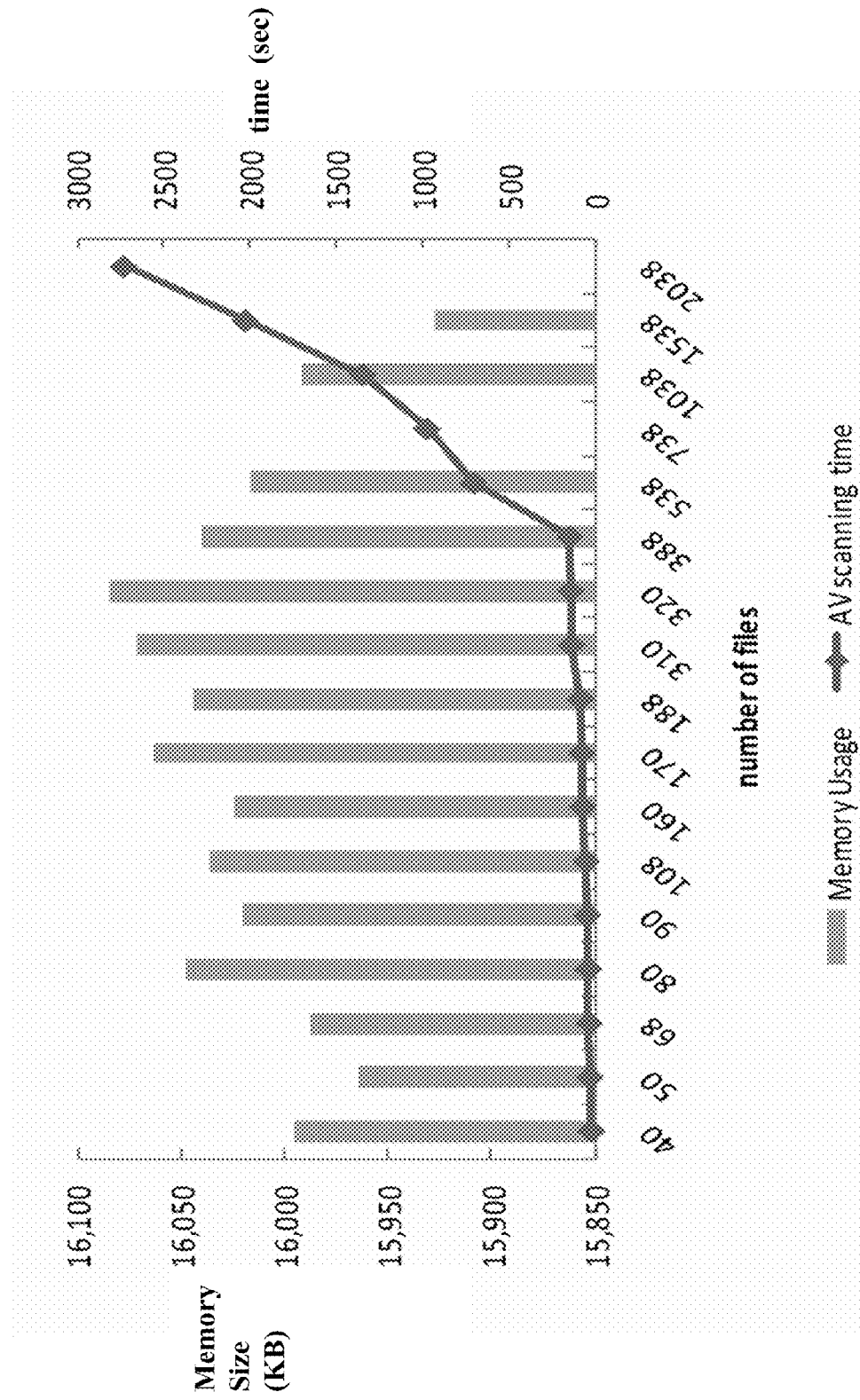

FIG. 18 illustrates memory usage and a scanning time when a malware scanning is performed using a mobile non-SOC-based and commercialized anti-virus engine.

In FIG. 18, bars indicate memory usage for the malware scanning, and a curve line indicates a time required for the malware scanning. In FIG. 18, a CPU of 800 MHz is used. As shown in FIG. 18, the memory usage of the non-SOC-based anti-virus engine is high even in a state where the number of files is low.

Also, FIG. 18 indicates that the bar height is reduced as the number of files is more than 320. However, this is because of a swapping operation of the memory. If the number of files to be scanned increases higher than the memory could handle, the operating system may perform a swapping operation of the memory. The swapping operation inevitably increases the scanning time and consequently battery consumption increases.

Figure 19:
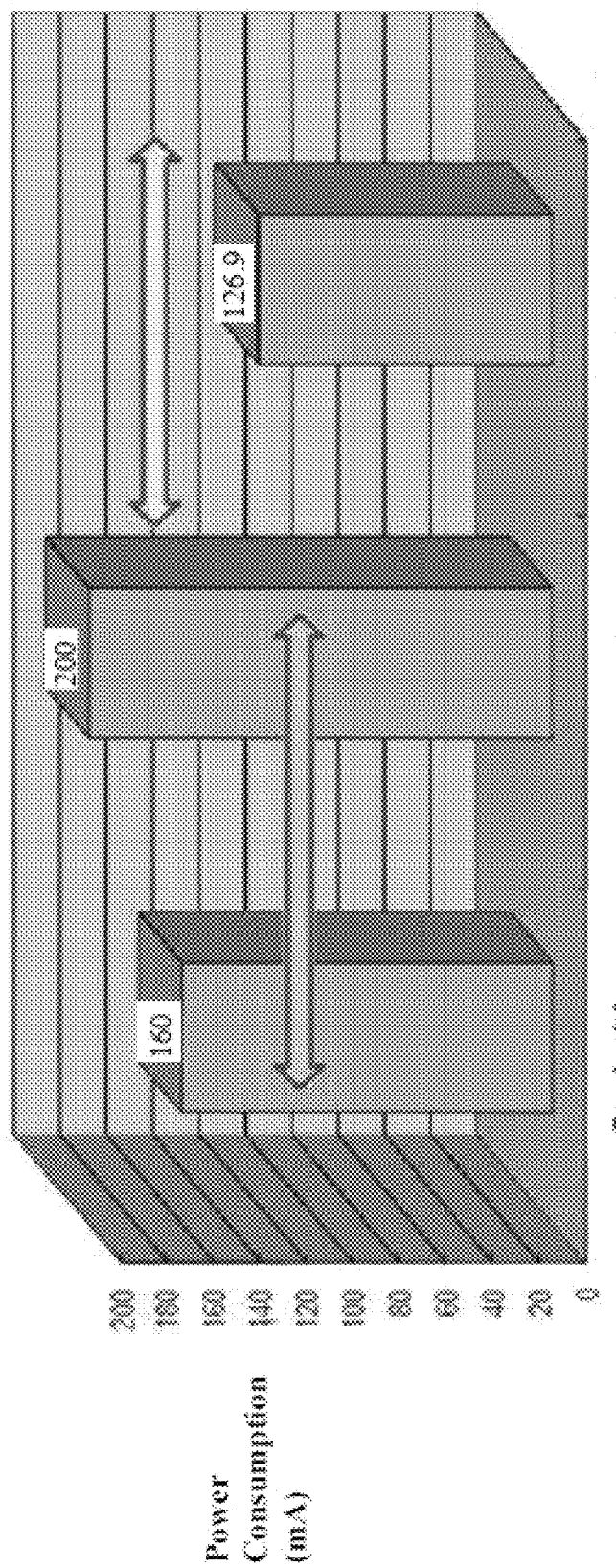

FIG. 19 illustrates power consumption of anti-virus engines, as a result of testing commercialized products and a SOC-based anti-virus engine according to an exemplary embodiment.

Referring to FIG. 19, the commercialized product 1 and the commercialized product 2 to be compared are anti-virus engines realized only by software, not based on SOC, and consume about 160 mA and about 200 mA, respectively. On the other hand, the SOC-based anti-virus scanning engine according to an exemplary embodiment is an engine configured by software and hardware logic and consumes about 126.9 mA.

Figure 20:
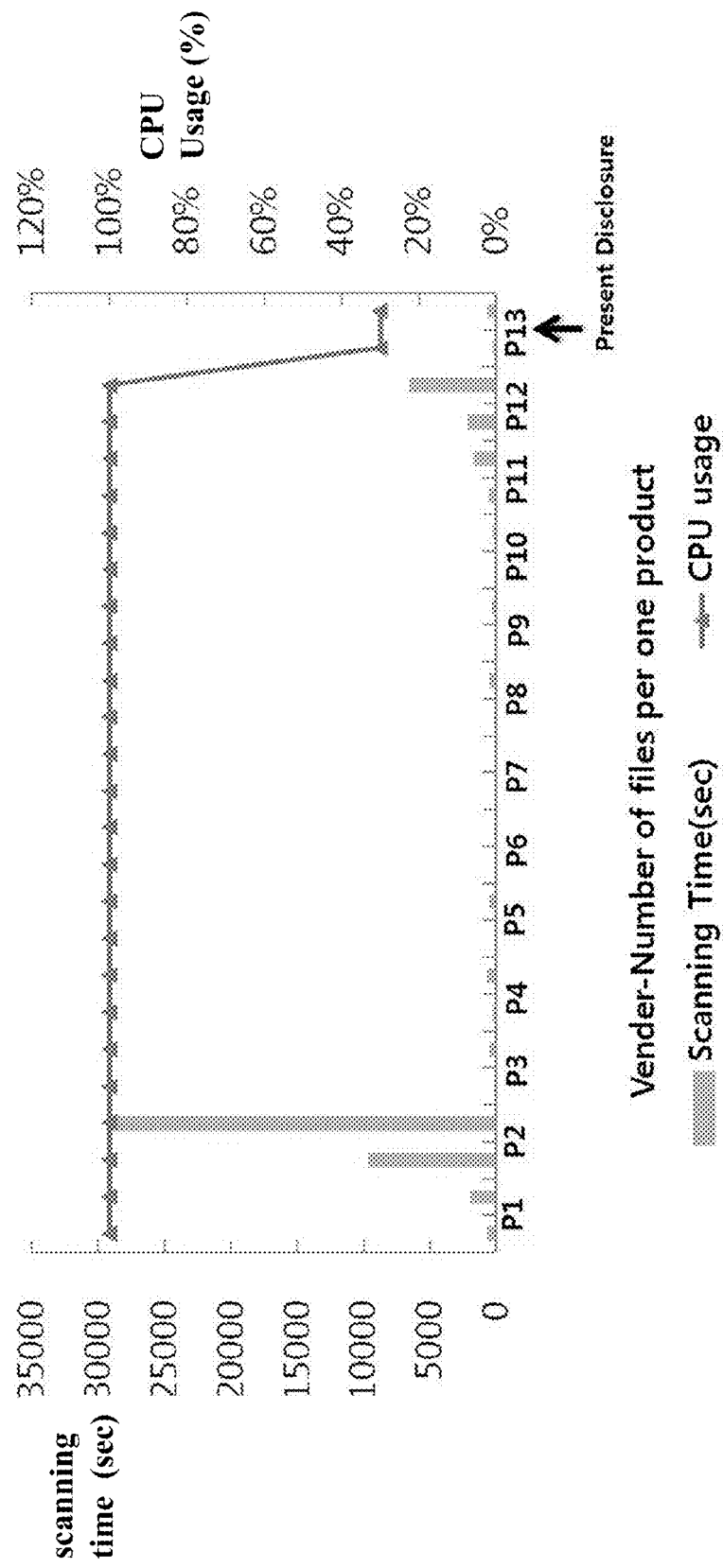

FIG. 20 illustrates a malware scanning time and a CPU usage time, as a result of testing products already commercialized for use in an existing mobile phone and a SOC-based anti-virus engine according to an exemplary embodiment.

FIG. 20 illustrates results of testing the already commercialized products P1, P2, P3, P4, P5, P6, P7, P8, P9, P10, P11, P12 and the SOC-based anti-virus engine P13 according to an exemplary embodiment two times for each product with different numbers of files to be scanned.

In FIG. 20, the CPU usage of the commercialized products is almost 100% and is much higher than that of the SOC-based anti-virus engine P13. As the CPU usage and the scanning time increase, battery consumption increases. Therefore, the exemplary embodiment has an effect of reducing battery consumption.

In addition, the preset exemplary embodiment P13 is tested using an FPGA board having a CPU of 50 MHz, whereas the already commercialized products use CPUs of several hundred MHz to several GHz. Therefore, it is predicted that the present embodiment is greatly superior to the already commercialized products in view of the CPU usage or the scanning time if the test is done under the same condition.

The exemplary embodiments may be embodied as computer programs and can be implemented in general-use digital computers that execute the programs by using a computer readable recording medium. Examples of the computer readable recording medium include magnetic storage media (e.g., ROM, floppy disks, hard disks, etc.), optical recording media (e.g., CD-ROMs, or DVDs), and storage media.

The apparatuses of the exemplary embodiments may include a bus coupled to every unit of the apparatus, at least one processor that is connected to the bus, the processor for executing commands, and a memory connected to the bus to store the commands, received messages, and generated messages. As also discussed above, the exemplary embodiments may be embodied as a SoC, including a processor, bus, and memory.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An anti-malware device comprising:
a computer processor comprising:
a communication unit which receives from a server, at least one hash coefficient and data;
a hash value generating unit which generates hash values for malware patterns and a hash value for target data by using a hash function having the at least one hash coefficient;
a table generating unit which generates a hash matcher table and a sub-matcher table based on the hash values for the malware patterns, the hash matcher table including indices as the hash values for the malware patterns associated with a value indicating that a collision occurs between two or more hash values mapped to a same index, and the sub-matcher table including the index associated with an offset collision pattern that maps the one of the two or more hash values to an alternate index, the sub-matcher table further associating at least one of the index and the alternate index with at least one of (i) a front value of the malware pattern and a middle value of the malware pattern and (ii) the middle value of the malware pattern and a tail value of the malware pattern, for resolving the collision;
a hash matcher unit which matches the hash value of the target data to the updated hash values of the malware patterns using the hash matcher table if the collision does not occur and the sub-matcher table if the collision occurs; and
a matching unit which matches the malware pattern and the target data if the hash matcher unit succeeds in the matching.

2. The anti-malware device of claim 1, wherein the communication unit, the hash value generating unit, the hash matcher unit, and the matching unit are disposed in a system-on-chip.

3. The anti-malware device of claim 1, wherein the at least one hash coefficient and/or the hash function are determined based on a minimum hash collision result among hash collision results generated from a plurality of hash functions applied to the malware patterns.

4. The anti-malware device of claim 1, wherein, when the malware patterns are updated to update malware patterns, the at least one hash coefficient and/or the hash function are changed based on a minimum hash collision result through a hash function for the update malware patterns.

5. The anti-malware device of claim 4, wherein the changed at least one hash coefficient and/or the changed hash function are included in the update malware patterns,
wherein the hash values for the malware patterns are first hash values and the hash value generating unit generates second hash values by using the changed at least one hash coefficient and/or the changed hash function included in the update malware patterns.

6. The anti-malware device of claim 4, wherein an update malware pattern database (DB) including the update malware patterns comprises a header item in which header information is written and a hash item in which the changed at least one hash coefficient and/or the changed hash function are written.

7. The anti-malware device of claim 1, wherein, when the hash values for the malware patterns to be transmitted to the anti-malware device are obtained, the hash function is determined so that a probability of collisions between the obtained hash values is minimized.

8. The anti-malware device of claim 1, wherein the malware patterns comprise at least one of virus pattern for virus scanning and rule pattern for firewall filtering, and the at least one hash coefficient comprises at least one of a virus hash coefficient for the virus scanning and a rule hash coefficient for the firewall filtering.

9. The anti-malware device of claim 1, wherein the anti-malware device corresponds to one of a system-on-chip (SOC) and a mobile device.

10. The anti-malware device of claim 1, wherein the anti-malware device is a portable handheld device.

11. The anti-malware device of claim 1, wherein the at least one hash coefficient and/or the hash function are received from the server connected to the anti-malware device over a network, with the malware patterns.

12. The anti-malware device of claim 11, wherein the hash values of the malware patterns are first hash values and the hash value generating unit generates second hash values of update malware patterns by using a hash coefficient transmitted with the update malware patterns when the hash value generating unit receives the update malware patterns from the server.

* * * * *